United States Patent
Alshina et al.

(10) Patent No.: US 10,003,805 B2
(45) Date of Patent: Jun. 19, 2018

(54) VIDEO ENCODING AND DECODING METHOD ACCOMPANIED WITH FILTERING, AND DEVICE THEREOF

(71) Applicant: SAMSUNG ELECTRONICS CO., LTD., Suwon-si (KR)

(72) Inventors: Elena Alshina, Suwon-si (KR); Alexander Alshin, Suwon-si (KR); Yong-jin Cho, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 230 days.

(21) Appl. No.: 14/902,629

(22) PCT Filed: Jul. 1, 2014

(86) PCT No.: PCT/KR2014/005872
§ 371 (c)(1),
(2) Date: Jan. 4, 2016

(87) PCT Pub. No.: WO2015/002444
PCT Pub. Date: Jan. 8, 2015

(65) Prior Publication Data
US 2016/0173881 A1 Jun. 16, 2016

Related U.S. Application Data

(60) Provisional application No. 61/841,532, filed on Jul. 1, 2013.

(51) Int. Cl.
*H04N 19/136* (2014.01)
*H04N 19/117* (2014.01)
(Continued)

(52) U.S. Cl.
CPC ......... *H04N 19/136* (2014.11); *H04N 19/117* (2014.11); *H04N 19/176* (2014.11);
(Continued)

(58) Field of Classification Search
CPC .. H04N 19/136; H04N 19/117; H04N 19/176; H04N 19/186; H04N 19/187;
(Continued)

(56) References Cited

U.S. PATENT DOCUMENTS 6,697,110 B1 2/2004 Jaspers et al.
2013/0194384 A1* 8/2013 Hannuksela ......... H04N 19/597
348/43

(Continued)

FOREIGN PATENT DOCUMENTS

JP 2013-48307 A 3/2013
KR 10-0574185 B1 4/2006

(Continued)

OTHER PUBLICATIONS

Fu et al., "Sample Adaptive Offset in the HEVC Standard," IEEE Transactions on Circuits and Systems for Video Technology, vol. 22, No. 12, Dec. 2012, pp. 1755-1764.*

(Continued)

*Primary Examiner* — Thai Tran
*Assistant Examiner* — Christopher T Braniff
(74) *Attorney, Agent, or Firm* — Sughrue Mion, PLLC

(57) ABSTRACT

A video decoding method includes determining, from among a first sample and a second sample with different color components, at least one second sample that is used to correct a value of the first sample; determining a filter parameter set based on a band including the value of the first sample, wherein the band is from among a plurality of bands determined by dividing a total range of sample values into signaled intervals or predetermined intervals; and filtering a value of the at least one second sample by using the determined filter parameter set and correcting the value of the first sample by using a value obtained by the filtering, wherein the first sample is any one of a luma sample and a (Continued)

chroma sample, and the second sample is any one of the luma sample and the chroma sample that is not the first sample.

17 Claims, 31 Drawing Sheets

(51) Int. Cl.
| | | |
|---|---|---|
| *H04N 19/186* | (2014.01) | |
| *H04N 19/187* | (2014.01) | |
| *H04N 19/30* | (2014.01) | |
| *H04N 19/44* | (2014.01) | |
| *H04N 19/80* | (2014.01) | |
| *H04N 19/82* | (2014.01) | |
| *H04N 19/176* | (2014.01) | |

(52) U.S. Cl.
CPC ......... *H04N 19/186* (2014.11); *H04N 19/187* (2014.11); *H04N 19/30* (2014.11); *H04N 19/44* (2014.11); *H04N 19/80* (2014.11); *H04N 19/82* (2014.11)

(58) Field of Classification Search
CPC ........ H04N 19/30; H04N 19/44; H04N 19/80; H04N 19/82
See application file for complete search history.

(56) References Cited

U.S. PATENT DOCUMENTS

| | | |
|---|---|---|
| 2013/0301720 A1 | 11/2013 | Lee et al. |
| 2014/0269913 A1* | 9/2014 | Lee .................. H04N 19/00266 375/240.12 |
| 2014/0286416 A1 | 9/2014 | Jeon et al. |

FOREIGN PATENT DOCUMENTS

| | | |
|---|---|---|
| KR | 10-2009-0016970 A | 2/2009 |
| KR | 10-2014-0122675 A | 10/2014 |
| WO | 2012/177053 A2 | 12/2012 |
| WO | 2013/070028 A1 | 5/2013 |

OTHER PUBLICATIONS

International Search Report (PCT/ISA/210) dated Oct. 10, 2014, issued in International Application No. PCT/KR2014/005872.
Written Opinion (PCT/ISA/237) dated Oct. 10, 2014, issued in International Application No. PCT/KR2014/005872.

* cited by examiner

FIG. 15
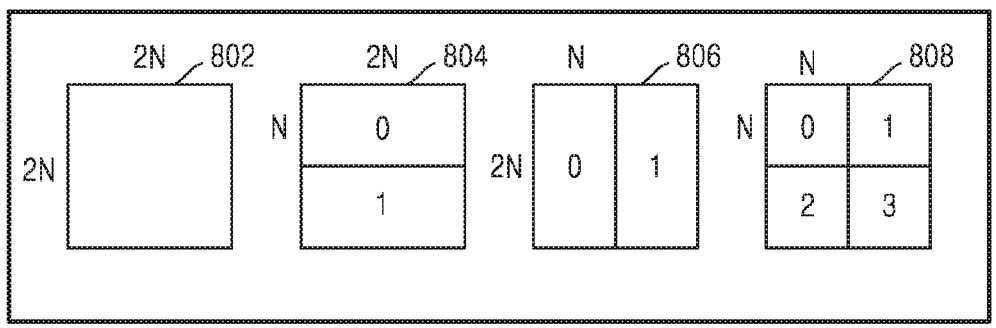
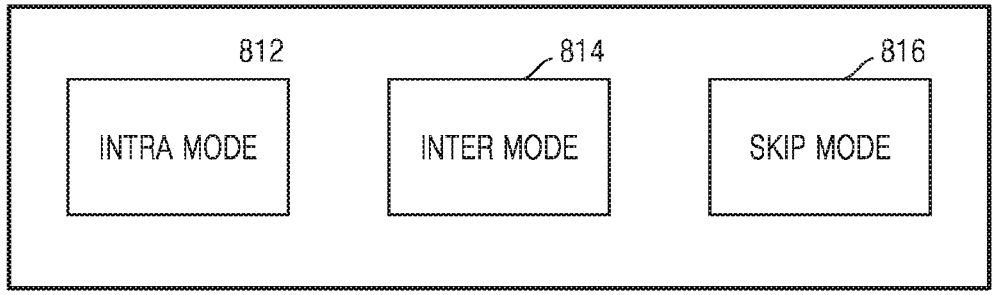
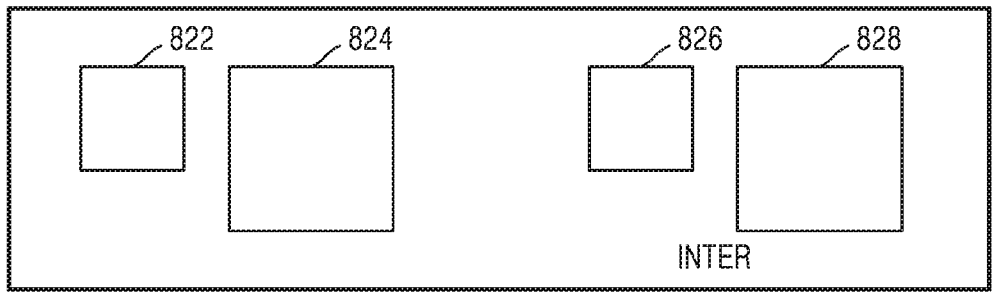

CODING UNIT (1010)

VIDEO ENCODING AND DECODING METHOD ACCOMPANIED WITH FILTERING, AND DEVICE THEREOF

TECHNICAL FIELD

The present disclosure relates to methods and apparatuses for encoding and decoding videos by filtering.

BACKGROUND ART

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

A video codec reduces an amount of data by using a prediction method based on a high temporal and spatial relationship between images of a video. According to the prediction method, image information is recorded by using a temporal or spatial distance between images, prediction errors, etc. so as to predict a current image by using peripheral images.

DETAILED DESCRIPTION OF THE INVENTION

Technical Problem

Provided are video encoding and decoding methods and apparatuses capable of adjusting a sample value by filtering.

Technical Solution

Provided are video encoding and decoding methods and apparatuses capable of adjusting a sample value by filtering.

According to an aspect of an exemplary embodiment, a video decoding method includes determining, from among a first sample and a second sample with different color components, at least one second sample that is used to correct a value of the first sample, determining a filter parameter set based on a band including the value of the first sample, the band is from among a plurality of bands determined by dividing a total range of sample values into signaled intervals or predetermined intervals, and filtering a value of the at least one second sample by using the determined filter parameter set and correcting the value of the first sample by using a value obtained by the filtering. The first sample is any one of a luma sample and a chroma sample, and the second sample is any one of the luma sample and the chroma sample that is not the first sample.

According to various exemplary embodiments, the determining of the filter parameter set includes determining a filter parameter set that corresponds to the band including the value of the first sample, from among filter parameter sets that respectively corresponding to the plurality of bands.

According to various exemplary embodiments, the determining of the at least one second sample includes determining at least one second sample located in an area corresponding to the first sample, and the second sample is a sample included in a base layer.

According to various exemplary embodiments, the determining of the filter parameter set includes receiving filter parameter sets that correspond to the plurality of bands, and determining, from among the received filter parameter sets, a filter parameter set that corresponds to the band including the value of the first sample as a filter parameter set that is used to correct the value of the first sample.

According to various exemplary embodiments, the receiving of the filter parameter sets includes receiving the filter parameter sets via a picture parameter set (PPS).

According to various exemplary embodiments, the determining of the filter parameter set includes determining a filter parameter set that is used to correct the value of the first sample, from among filter parameter sets that correspond to blocks included in a current image.

According to various exemplary embodiments, the method is performed in at least one selected from an intra prediction filter, an inter prediction filter, a post-processing filter, and an in-loop filter.

According to an aspect of another exemplary embodiment, a video encoding method includes determining, from among a first sample and a second sample with different color components, at least one second sample that is used to correct a value of the first sample, determining a filter parameter set based on a band including the value of the first sample, the band is from among a plurality of bands determined by dividing a total range of sample values into signaled intervals or predetermined intervals, and filtering a value of the at least one second sample by using the determined filter parameter set and correcting the value of the first sample by using a value obtained by the filtering. The first sample is any one of a luma sample and a chroma sample, and the second sample is any one of the luma sample and the chroma sample that is not the first sample.

According to various exemplary embodiments, the determining of the filter parameter set includes determining a filter parameter set that corresponds to the band including the value of the first sample, from among filter parameter sets that respectively corresponding to the plurality of bands.

According to various exemplary embodiments, the method further includes transmitting filter parameter sets that correspond to the plurality of bands.

According to various exemplary embodiments, the transmitting of the filter parameter sets includes transmitting the filter parameter sets via a PPS.

According to various exemplary embodiments, the determining of the at least one second sample includes determining at least one second sample located in an area corresponding to a location of the first sample, and the second sample is a sample included in a base layer.

According to various exemplary embodiments, the determining of the filter parameter set includes determining the filter parameter set from among filter parameter sets that correspond to blocks included in a current image.

According to various exemplary embodiments, the method is performed in at least one selected from an intra prediction filter, an inter prediction filter, a post-processing filter, and an in-loop filter.

According to an aspect of another exemplary embodiment, a video decoding apparatus includes a sample determiner determining, from among a first sample and a second sample with different color components, at least one second sample that is used to correct a value of the first sample, and a decoder determining a filter parameter set based on a band including the value of the first sample, the band is from among a plurality of bands determined by dividing a total range of sample values into signaled intervals or predetermined intervals, filtering a value of the at least one second sample by using the determined filter parameter set, and correcting the value of the first sample by using a value obtained by the filtering. The first sample is any one of a luma sample and a chroma sample, and the second sample is any one of the luma sample and the chroma sample that is not the first sample.

According to an aspect of another exemplary embodiment, a video encoding apparatus includes a sample determiner determining, from among a first sample and a second sample with different color components, at least one second sample that is used to correct a value of the first sample, and an encoder determining a filter parameter set based on a band including the value of the first sample, the band is from among a plurality of bands determined by dividing a total range of sample values into signaled intervals or predetermined intervals, filtering a value of the at least one second sample by using the determined filter parameter set, and correcting the value of the first sample by using a value obtained by the filtering. The first sample is any one of a luma sample and a chroma sample, and the second sample is any one of the luma sample and the chroma sample that is not the first sample.

A non-transitory computer-readable recording medium having recorded thereon a program, which, when executed by a computer, performs the methods according to the exemplary embodiments.

Advantageous Effects of the Invention

Improved video encoding and decoding methods and apparatuses capable of adjusting a sample value by filtering may be provided.

DESCRIPTION OF THE DRAWINGS

FIG. 15 is a diagram for describing encoding information of coding units, according to an embodiment;

MODE OF THE INVENTION

Figure 1A:
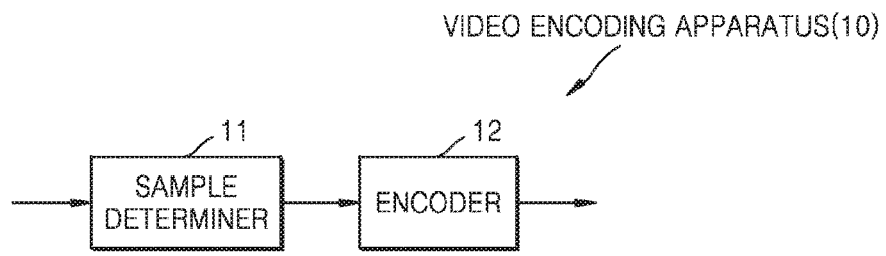
FIG. 1A is a block diagram of a video encoding apparatus, according to various exemplary embodiments.

According to various exemplary embodiments described in the present specification, the term 'image' may indicate a still image, a moving image of a video, or a video itself.

Hereinafter, the term 'sample' indicates data allocated to a sampling location of an image, the data that is a processing target. For example, pixels in an image of a spatial area may be samples. As another example, residuals that correspond to pixels in an image of a spatial area may be samples.

Hereinafter, a video encoding method, a video decoding method, a video encoding apparatus, and a video decoding apparatus related to locations of integer pixels according to exemplary embodiments will be described with reference to FIGS. 1A to 7. Also, a video encoding method and video decoding method based on coding units having a tree structure according to various embodiments that are applicable to the video encoding method and the video decoding method will be described with reference to FIGS. 8 through 20. Various embodiments to which the video encoding method and the video decoding method are applicable will be described with reference to FIGS. 21 through 27. As used herein, the term "and/or" includes any and all combinations of one or more of the associated listed items. Expressions such as "at least one selected from," when preceding a list of elements, modify the entire list of elements and do not modify the individual elements of the list.

In FIGS. 1A to 7, the term 'band' may indicate a range that is determined as a certain width. For example, when brightness of a sample having integers 0 to 255 is split into a band having a width of 64, brightness of the sample may be formed as eight bands.

In order to display a color image, each pixel includes a YCbCr color space or a YUV color space to distinguish and store luma samples and chroma samples. Y may indicate a luma sample, and Cb and Cr or U and V may indicate chroma samples. Luma may indicate luminance, and chroma may indicate chrominance. U may indicate a difference value between a luma signal component and a blue signal component, and may also be shown as 'Cb.' V may indicate a difference value between a luma signal component and a red signal component, and may also be shown as 'Cr.'

According to an exemplary embodiment, YCbCr sampling formats may include 4:4:4, 4:2:2, and 4:2:0. For example, according to a YCbCr 4:2:0 format, Cb (or Cr) may be sampled by a ratio of 1:4 with respect to Y.

According to the YCbCr sampling format, a luma sample and a chroma sample may have different locations.

Also, there may be a relationship between a luma sample value and a chroma sample value. Therefore, the luma sample value or the chroma sample value may be corrected by using the relationship between the luma sample value and the chroma sample value.

The relationship between the luma sample value and the chroma sample value may be related to a distance between the luma sample and the chroma sample. Therefore, the luma sample value or the chroma sample value may be corrected based on the distance between the luma sample and the chroma sample.

For example, a luma sample value that is located within a certain distance away from a first chroma sample may be related to the first chroma sample. Therefore, the luma sample value located within a certain distance away from the first chroma sample may be used to correct a first chroma sample value. Alternatively, a value of a chroma sample located within a certain distance away from a first luma sample may be used to correct the first luma sample value.

As another example, the closer the chroma pixel is to the luma pixel, the more a value of a chroma pixel is related to a value of a luma pixel. The farther away the chroma pixel is from the luma pixel, the less the value of the chroma pixel is related to the value of the luma pixel. Various exemplary embodiments are provided below to describe encoding and decoding methods based on a relationship between the chroma sample value and the luma sample value.

FIG. 1A is a block diagram of a video encoding apparatus 10, according to various exemplary embodiments.

As shown in FIG. 1A, the video encoding apparatus 10 may include a sample determiner 11 and an encoder 12. However, the video encoding apparatus 10 may include more or less components than those shown in FIG. 1A.

The video encoding apparatus 10 may generate a data stream. The data stream generated by the video encoding apparatus 10 may be configured of Network Abstraction Layer (NAL) units.

The NAL unit is a basic unit that configures a bitstream. Also, one or more NAL units may configure a data stream.

The video encoding apparatus 10 may transmit the data stream configured of one or more NAL units to an external source.

According to an exemplary embodiment, each of the NAL units may include 2-byte header information. According to an exemplary embodiment, the video encoding apparatus 10 may identify overall information of inner data of each of the NAL units by including 2-byte header information in each of the NAL units.

Hereinafter, an encoding process of the video encoding apparatus 10 will be described.

The video encoding apparatus 10 according to various exemplary embodiments may classify and encode a plurality of image sequences for each layer according to scalable video coding, and may output a separate stream including data encoded for each layer. Also, the video encoding apparatus 10 may transform and output bitstreams output for each layer as one bitstream by multiplexing.

The video encoding apparatus 10 may encode a current layer image sequence and a reference layer image sequence according to different layers.

The encoder 12 may encode current layer images, and output a current layer stream that includes encoding data of the current layer images.

The encoder 12 may encode reference layer images, and output a reference layer stream including encoding data of the reference layer images encoding.

For example, according to scalable video coding based on spatial scalability, low resolution images may be encoded as the reference layer images, and high resolution images may be encoded as the current layer images. An encoding result of the reference layer images may be output in a reference layer stream. An encoding result of the current layer images may be output in a current layer stream.

As another example, a multi-view video may be encoded according to scalable video coding. Left view images may be encoded as the reference layer images, and right view images may be encoded as the current layer images. Alternatively, center view images, left view images, and right view images may be encoded respectively as first layer images, second layer images, and third layer images.

As another example, scalable video coding may be performed according to temporal hierarchical prediction based on temporal scalability. A reference layer stream including encoding information generated by encoding images of a base frame rate may be output. Temporal levels may be classified for each frame rate and may be respectively encoded in layers. A current layer stream including encoding information of a high speed frame rate may be output by further encoding images of the high frame rate with reference to the images of the basic frame rate.

Scalable video coding may be performed on a reference layer and a plurality of current layers. In the presence of three or more current layers, reference layer images, first current layer images, second current layers images, . . . , Kth current layer images may be encoded. Accordingly, an encoding result of the reference layer images may be output in the reference layer stream, and encoding results of the first current layer images, second current layers images, . . . , Kth current layer images may be respectively output in first, second, . . . Kth current layer streams.

The video encoding apparatus 10 may perform inter-layer prediction for predicting the current layer images with reference to the reference layer image. For example, the video encoding apparatus 10 may predict enhanced layer images with reference to base layer images. A base layer may refer to a layer that is reference when encoding an enhanced layer. Therefore, a current layer may correspond to an enhanced layer, and a base layer may correspond to a reference layer.

According to various exemplary embodiments, the video encoding apparatus 10 may generate symbol data by performing source coding operations including inter prediction or intra prediction of base layer images. For example, the video encoding apparatus 10 may generate symbol data by performing inter prediction or intra prediction, transformation, quantization on samples of data units of the base layer images, and may generate a base layer stream by performing entropy encoding on the symbol data.

The video encoding apparatus 10 may encode enhanced layer images based on coding units having a tree structure. The video encoding apparatus 10 may generate symbol data by performing prediction, transformation, and quantization on samples of coding units of an enhanced layer image, and may generate an enhanced layer stream by performing entropy encoding on the symbol data.

According to various exemplary embodiments, the video encoding apparatus 10 may perform inter-layer prediction for predicting an enhanced layer image, by using a reconstruction sample of a base layer image. In order to encode an enhanced layer original image in an enhanced layer image sequence based on an inter-layer prediction structure, the video encoding apparatus 10 may generate an enhanced layer prediction image by using a base layer reconstruction image, and encode prediction error between the enhanced layer original image and the enhanced layer prediction image.

The video encoding apparatus 10 may perform inter-layer prediction on an enhanced layer image for each block such as coding units or prediction units. The video encoding apparatus 10 may determine a block of a base layer image that is to be referenced by a block of the enhanced layer image. For example, a reconstruction block of the base layer image may be determined according to a location of a current block in the enhanced layer image. The video encoding apparatus 10 may determine an enhanced layer prediction block by using a base layer reconstruction block that corresponds to an enhanced layer block.

The video encoding apparatus 10 may use the enhanced layer prediction block, which is determined by using the base layer reconstruction block according to the inter-layer prediction structure, as a reference image for inter-layer prediction of an enhanced layer original block.

In order to determine an enhanced layer prediction image (block) by using a base layer reconstruction image (block) as described above, it is necessary to perform an upsampling operation to enlarge the base layer reconstruction image to a size of the enhanced layer image. An exemplary embodiment related to the upsampling operation will be described with reference to FIG. 4.

The video encoding apparatus 10 according to various embodiments encodes each video image for each respective block according to each layer. A block may have a square shape, a rectangular shape, or any geometric shape and is not limited to a data unit having a predetermined size. A block may be a largest coding unit, a coding unit, a prediction unit, a transformation unit, or the like from among coding units according to a tree structure. The largest coding unit including coding units having the tree structure is diversely referred to as a coding block unit, a coding block tree, a block tree, a root block tree, a coding tree, a coding root or a tree trunk. Video encoding and decoding methods based on coding units having the tree structure will now be described with reference to FIGS. 8 through 20.

From among a first sample and a second sample with different color components, the sample determiner 11 according to an exemplary embodiment may determine at least one second sample that is used to correct a value of the first sample. The first sample may be the luma sample or the chroma sample, and the second sample may be the luma sample or the chroma sample that is not the first sample.

For example, the sample determiner 11 may determine at least one chroma sample that is used to correct a luma sample value. As another example, the sample determiner 11 may determine at least one luma sample that is used to correct a chroma sample value.

According to an exemplary embodiment, the sample determiner 11 may determine at least one second sample, which is located in an area corresponding to a location of the first sample, as a sample for correcting the first sample.

For example, the sample determiner 11 may determine at least one chroma sample, which is located in an area corresponding to a location of the luma sample, as a sample for correcting the luma sample. As another example, the sample determiner 11 may determine at least one luma sample, which is located in an area corresponding to a location of the chroma sample, as a sample for correcting the chroma sample.

The second sample may be a sample included in a base layer. Therefore, a value of a sample in an enhanced layer may be corrected by using a value of the sample in the base layer. A relevant exemplary embodiment will be described with reference to FIG. 4.

The encoder 12 according to an exemplary embodiment may determine bands by dividing a total range of a value of a sample into signaled intervals or predetermined intervals, and determine a filter parameter set based on a band including a value of the first sample from among the bands. The value of the first sample may include a luma sample value (Y) or a value of a chroma sample (U or V).

When determining the filter parameter set, the encoder 12 according to an exemplary embodiment may reference an interval that includes a value of a sample. For example, the encoder 12 may determine a filter parameter set that corresponds to a band that includes the value of the sample as a filter parameter set for correcting the value of the sample, from among filter parameter sets that respectively correspond to the bands that are determined by dividing a total range of a value of the sample into signaled intervals or predetermined intervals.

According to an exemplary embodiment, the filter parameter sets may be stored in advance. As another example, the video encoding apparatus 10 may transmit the filter parameter sets via signaling. The video encoding apparatus 10 according to an exemplary embodiment may transmit a parameter p for selecting a filter parameter set when transmitting the filter parameter sets.

For example, when a sample has a value between 0 and 255, a sample value may be expressed as an integer between 0 and 255. When the sample value is a luma sample value, brightness of the sample may be one among 0 and 255.

A total range of a predetermined sample value may be divided into signaled intervals or predetermined intervals. The total range of the sample value may be divided into a plurality of bands. For example, when the total range of the sample value is from 0 to 255 and a width of each of the bands is 8, the total range of the sample value may include 32 bands.

The encoder 12 may determine a band, in which a sample value is located, from among the plurality of bands. The encoder 12 may determine the filter parameter set according to a location of a band including the sample value from among the bands.

For example, different filter parameter sets may respectively correspond to the plurality of bands. A filter parameter set that corresponds to a band including the sample value may be used to correct the sample value.

As another example, an identical filter parameter set may correspond to some bands from among the plurality of bands. When a first band including a value of the first sample and a second band including a value of the second sample correspond to the same filter parameter set, the values of the first sample and the second sample may be filtered by the same filter.

The band will be described below with reference to FIG. 6A.

The video encoding apparatus 10 according to an exemplary embodiment may transmit the filter parameter sets that correspond to the bands to an external source.

Since reconstruction of the sample value, filtering of the sample value, and correction of the sample value are performed even when performing encoding, the encoder 12 may perform an operation of determining a filter parameter set for performing filtering. The encoder 12 may transmit information of a filter parameter set that is determined for performing filtering from among a plurality of filter parameter sets.

The filter parameter set may be determined based on a plurality of conditions.

The filter parameter set according to an exemplary embodiment may be determined based on a location of an image of a block including a correction target sample. Relevant exemplary embodiment will be described with reference to FIG. 5.

The filter parameter set according to an exemplary embodiment may be determined based on a location of a sub-pixel unit sample that is used in a resampling process. For example, the filter parameter set may be determined according to a location of a sub-pixel unit sample in an image of a correction target sample.

The filter parameter set according to an exemplary embodiment may be determined based on values of samples located near the correction target sample. The video encoding apparatus 10 may compare the values of the samples near the correction target sample and determine edge features, and determine a filter parameter set for correcting a value of the correction target sample, from among filter parameter sets that are classified according to edge features.

The encoder 12 according to an exemplary embodiment may determine a filter parameter set used for correcting the value of the first sample, from among filter parameter sets that correspond to blocks configuring a current image. For example, the filter parameter sets may respectively correspond to the blocks that configure the current image.

As another example, the encoder 12 may determine the filter parameter set used for correcting the value of the first sample, based on a band including the value of the first sample and a location of a block including the first sample in an image.

The filter parameter set may be determined in advance or signaled via a bitstream.

For example, the video encoding apparatus 10 may transmit the filter parameter sets that correspond to the bands via a picture parameter set (PPS). As another example, the video encoding apparatus 10 may transmit the filter parameter sets that correspond to the bands via a video parameter set (VPS) or a sequence parameter set (SPS).

The encoder 12 according to an exemplary embodiment may use the filter parameter set determined by using the above method, filter a value of the at least one second sample determined by the sample determiner 11, and correct the value of the first sample by using a value obtained by filtering.

The encoder 12 may use a color component that is different from a sample corrected when correcting a sample value.

For example, at least one selected from the luma sample value and the chroma sample value may be used to correct the luma sample value. As another example, at least one selected from the luma sample value and the chroma sample value may be used to correct the chroma sample value.

The encoding apparatus 10 according to an exemplary embodiment video may transmit a quantization bit. For example, during transmission of M, when a quantization bit is b, a value obtained by shifting M rightward by b (M>>b) may be used during transmission. The quantization bit may be predetermined based on a quantization parameter (QP) about a slice.

Also, the quantization bit may be a signaled value. For example, the video encoding apparatus 10 may transmit the quantization bit via at least one selected from PPS, VPS and SPS.

The video encoding apparatus 10 according to various exemplary embodiments may encode by using Equations (1) to (8) below, which will be described with reference to FIG. 2A.

Relevant exemplary embodiments will be described with reference to FIGS. 7A and 7C.

The video encoding apparatus 10 according to an exemplary embodiment may include a central processor (not shown) that generally controls the sample determiner 11 and the encoder 12. Alternatively, the sample determiner 11 and the encoder 12 may operate by their respective processors (not shown), and the video encoding apparatus 10 may generally operate according to interactions of the processors (not shown). Alternatively, the sample determiner 11 and the encoder 12 may be controlled according to the control of an external processor (not shown) of the video encoding apparatus 10.

The video encoding apparatus 10 according to an exemplary embodiment may include one or more data storage units (not shown) in which input and output data of the sample determiner 11 and the encoder 12 is stored. The video encoding apparatus 10 may include a memory control unit (not shown) that observes data input and output of the data storage units (not shown).

The video encoding apparatus 10 according to an exemplary embodiment may operate in connection with an internal video encoding processor or an external video encoding processor so as to output video encoding results, thereby performing a video encoding operation including transformation. Not only a separate processor, but also the video encoding apparatus 10, a central processor, or a graphic processor may include a video encoding processing module so that the internal video encoding processor of the video encoding apparatus 10 the internal video encoding processor of the video encoding apparatus 10 may perform basic video encoding Hereinafter, operations of the video encoding apparatus 10 will be described with reference to FIG. 1B.

Figure 1B:
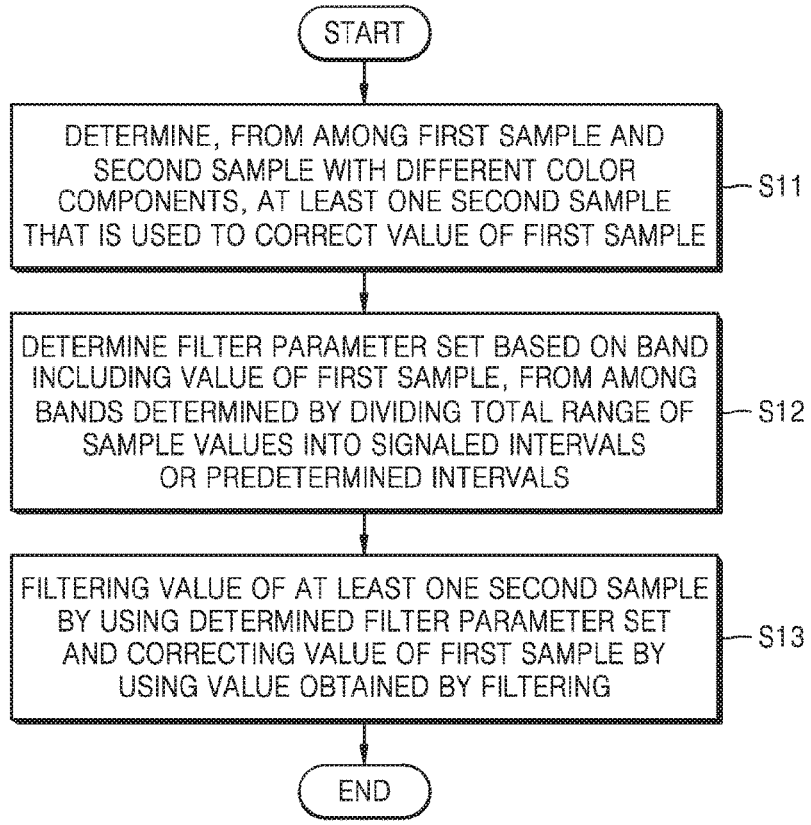
FIG. 1B is a flowchart of a video encoding method, according to various exemplary embodiments.

FIG. 1B is a flowchart of a video encoding method, according to various exemplary embodiments.

The video encoding method described below assumes that a first sample is any one of a luma sample and a chroma sample, and a second sample is any one of the luma sample and the chroma sample which is not the first sample.

In operation S11, the sample determiner 11 may determine at least one second sample that is used to correct the first sample from among the first sample and the second sample having different color components.

The sample determiner 11 may determine at least one second sample that is located in an area corresponding to a location of the first sample.

The first sample and the second sample may have different resolutions. For example, the second sample may be a sample in a base layer, and the first sample may be a sample in an enhanced layer. As another example, the second sample may be a non-upsampled sample, and the first sample may be an upsampled sample.

In operation S12, the encoder 12 may determine bands by dividing a total range of a sample value into signaled intervals or predetermined intervals, and determine a filter parameter set according to a band including a value of the first sample from among the bands. As described above, the value of the first sample may be a luma sample value (Y) or a value of a chroma sample (U or V).

Alternatively, the encoder 12 may determine bands by dividing a total range of a sample value into signaled intervals or predetermined intervals, and from among filter parameter sets that respectively correspond to the determined bands, determine a filter parameter set, which corresponds to a band including the sample value, as a filter parameter set for correcting the sample value.

The encoder 12 according to an exemplary embodiment may transmit the filter parameter sets corresponding to the bands to an external source. Also, the encoder 12 may determine a filter parameter set that corresponds to the band including the sample value as a filter parameter set for correcting the sample value. The encoder 12 may transmit information of the filter parameter set that is determined to perform filtering from among the filter parameter sets. Since reconstruction of the sample value, filtering of the sample value, and correction of the sample value are performed even when performing encoding, the encoder 12 may perform an operation of determining the filter parameter set for performing filtering.

The encoder 12 according to another exemplary embodiment may determine a filter parameter set for correcting the sample value, from among filter parameter sets that correspond to blocks configuring a current image.

For example, the filter parameter sets may respectively correspond to the blocks that configure the current image.

As another example, the encoder 12 may determine the filter parameter set used for correcting a value of the first sample, based on a band including the value of the first sample and a location of a block including the first sample in an image.

The filter parameter set may be determined in advance or signaled via a bitstream. For example, the video encoding apparatus 10 may transmit the filter parameter sets that correspond to the bands via a PPS. As another example, the video encoding apparatus 10 may transmit the filter parameter sets that correspond to the bands via at least one selected from a VPS or a SPS.

In operation S13, the encoder 12 filters a value of the at least one second sample determined in operation S11 by using the filter parameter set determined in operation S12, and correct the value of the first sample by using a value obtained by filtering.

The encoder 12 may use a color component that is different from a sample corrected when correcting a sample value.

Also, the encoder 12 may correct a value of a correction target sample by using Equations (1) to (8), as described below.

Figure 2A:
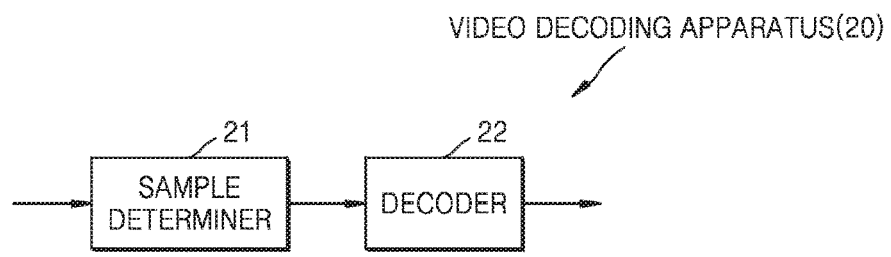
FIG. 2A is a block diagram of a video decoding apparatus, according to various exemplary embodiments.

FIG. 2A is a block diagram of a video decoding apparatus 20, according to various exemplary embodiments.

As shown in FIG. 2A, the video decoding apparatus 20 may include a sample determiner 21 and a decoder 22. However, the video decoding apparatus 20 may include more or less components than those shown in FIG. 2A.

The video decoding apparatus 20 according to various embodiments may receive bitstreams for each layer according to scalable encoding. The number of layers of the bitstreams received by the video decoding apparatus 20 is not limited.

The video decoding apparatus 20 based on spatial scalability may receive streams in which image sequences of different resolutions are encoded according to different layers. A low resolution image sequence may be reconstructed by decoding the reference layer stream, and a high resolution image sequence may be reconstructed by decoding the current layer stream.

A multi-view video may be decoded according to scalable video coding. When a stereoscopic video stream is received in multiple layers, the reference layer stream may be decoded to reconstruct left view images. The current layer stream may be further decoded to the reference layer stream to reconstruct right view images.

Alternatively, when a multi-view video stream is received in multiple layers, a first layer stream may be decoded to reconstruct center view images. A second layer stream may be further decoded to the first layer stream to reconstruct the left view images. A third layer stream may be further decoded to the first layer stream to reconstruct the right view images.

As another example, scalable video coding based on temporal scalability may be performed. The reference layer stream may be decoded to reconstruct base frame rate images. The current layer stream may be further decoded to the reference layer stream to reconstruct high speed frame rate images.

In the presence of three or more current layers, reference layer images may be reconstructed from the reference layer stream. If the current layer stream is further decoded by referring to reference layer reconstruction images, current layer images may be further reconstructed. If a Kth layer stream is further decoded by referring to current layer reconstruction images, Kth layer images may be further reconstructed.

The video decoding apparatus 20 may obtain encoded data of the reference layer images and current layer images from the reference layer stream and the current layer stream and may further obtain a motion vector generated through inter prediction and prediction information generated through inter-layer prediction.

For example, the video decoding apparatus 20 may decode inter-predicted data for each layer and may decode inter-layer-predicted data between a plurality of layers. Reconstruction may be performed through motion compensation and inter-layer decoding based on a coding unit or a prediction unit.

Motion compensation for a current image is performed by referring to reconstruction images predicted through inter prediction of a same layer on each layer stream, and thus images may be reconstructed. Motion compensation means an operation of synthesizing a reference image determined by using a motion vector of the current image and a residual of the current image and reconfiguring a reconstruction image of the current image.

The video decoding apparatus 20 may perform inter-layer decoding with reference to the reference layer images so as to reconstruct a current layer image predicted through inter-layer prediction. Inter-layer decoding means an operation of reconfiguring a reconstruction image of the current image by synthesizing a residual component of the current image and a reference image of a layer other than a current layer determined to predict the current image.

The video decoding apparatus 20 may perform inter-layer prediction for predicting current layer images with reference to the reference layer images. For example, the video decoding apparatus 20 may predict enhanced layer images with reference to base layer images. A base layer may refer to a layer that is reference when encoding an enhanced layer. Therefore, a current layer may correspond to an enhanced layer, and a base layer may correspond to a reference layer.

The video decoding apparatus 20 according to an embodiment may perform inter-layer decoding for reconstructing the reference layer images predicted with reference to the current layer images.

However, the decoder 22 according to various embodiments may decode the current layer stream without referring to the reference layer image sequence. Thus, it is not limited to construe that the decoder 22 performs only inter-layer prediction in order to decode the current layer image sequence.

The video decoding apparatus 20 may decode each image of a video for each block. A block according to an exemplary embodiment may include a largest coding unit, a coding unit, a prediction unit, a transformation unit, etc. among coding units according to a tree structure.

The decoder 22 may decode the reference layer image by using encoding symbols of a parsed reference layer image. If the video decoding apparatus 20 receives encoded streams based on coding units having a tree structure, the decoder 22 may perform decoding based on the coding units having the tree structure for each largest coding unit of the reference layer stream.

The decoder 22 may perform entropy encoding for each largest coding unit and may obtain encoding information and encoded data. The decoder 22 may perform inverse quantization and inverse transformation on the encoded data obtained from streams to reconstruct a residual. The decoder 22 according to another exemplary embodiment may directly receive a bitstream of quantized transformation coefficients. A residual of the images may be reconstructed as a result of performing inverse quantization and inverse transformation on the quantized transformation coefficients.

The decoder 22 may reconstruct the first layer images by determining a prediction image, combining the prediction image and the residual through motion compensation between same layer images.

The decoder 22 may generate a reference layer prediction image by using samples of a reference layer reconstruction image according to the inter-layer prediction structure. The decoder 22 may decode the current layer stream to obtain a prediction error according to inter-layer prediction. The decoder 22 may combine the current layer prediction image and the prediction error, thereby generating the current layer reconstruction image.

The decoder 22 may determine the current layer prediction image using the decoded reference layer reconstruction image. The decoder 22 may determine a block of the reference layer image to which a block such as a coding unit or a prediction unit of the current layer image is to refer according to the inter-layer prediction structure. For example, a reconstruction block of the first layer image located in the second layer image in correspondence to a location of a current block may be determined. The decoder 22 may determine a current layer prediction block using a reference layer reconstruction block corresponding to a current layer block.

The decoder 22 may use the reference layer prediction block determined using according to the inter-layer prediction structure as a reference image for inter-layer predicting of a current layer original block. In this case, the decoder 22 may reconstruct the current layer block by synthesizing a sample value of the current layer prediction block determined using the reference layer reconstruction image and a residual according to inter-layer prediction.

According to spatial scalable video coding, when the decoder 22 reconstructs the reference layer image of a different resolution from the current layer image, the decoder 22 may interpolate the reference layer reconstruction image to scale the reference layer reconstruction image to have the same resolution as that of the current layer original image. The interpolated reference layer reconstructed image may be determined as the current layer prediction image for inter-layer prediction.

The video decoding apparatus 20 may receive a data stream. The data stream received by the video decoding apparatus 20 may be configured of NAL units.

The NAL unit is a basic unit that configures a bitstream. Also, one or more NAL units may configure a data stream. The video decoding apparatus 20 may transmit the data stream configured of one or more NAL units to an external source.

The video decoding apparatus 20 may receive the data stream, separate the data stream into NAL units, and decode each of the NAL units.

Each of the NAL units may include 2-byte header information. Also, the video decoding apparatus 20 decode the 2-byte header information in each of the NAL units so as to identify overall information of inner data of each of the NAL units.

The video decoding apparatus 20 according to various exemplary embodiments may generate symbol data by performing source coding operations including inter prediction or intra prediction of base layer images. For example, the video decoding apparatus 20 may generate symbol data by performing inter prediction or intra prediction, transformation, quantization on samples of data units of the base layer images, and may generate a base layer stream by performing entropy encoding on the symbol data.

Also, the video decoding apparatus 20 may perform filtering when performing video decoding.

The video decoding apparatus 20 according to an exemplary embodiment may generate enhanced filtered symbol data by filtering the symbol data generated by performing inter prediction or intra prediction.

The video decoding apparatus 20 according to another exemplary embodiment may generate an enhanced reconstructed image signal by filtering a reconstructed image signal.

During in-loop filtering, the video decoding apparatus 20 according to another exemplary embodiment may perform additional filtering other than deblocking filtering and sample adaptive offset (SAO) filtering.

Hereinafter, a decoding operation of the video decoding apparatus 20 will be described.

From among a first sample and a second sample with different color components, the sample determiner 21 according to an exemplary embodiment may determine at least one second sample that is used to correct a value of the first sample. The first sample may be the luma sample or the chroma sample, and the second sample may be the luma sample or the chroma sample that is not the first sample.

For example, the sample determiner 21 may determine at least one chroma sample that is used to correct a luma sample value. As another example, the sample determiner 21 may determine at least one luma sample that is used to correct a chroma sample value.

The sample determiner 21 according to an exemplary embodiment may determine at least one second sample, which is located in an area corresponding to a location of the first sample, as a sample for correcting the first sample.

For example, the sample determiner 21 may determine at least one chroma sample, which is located in an area corresponding to a location of the luma sample, as a sample for correcting the luma sample. As another example, the sample determiner 21 may determine at least one luma sample, which is located in an area corresponding to a location of the chroma sample, as a sample for correcting the chroma sample.

Also, the second sample may be a sample included in a base layer. Therefore, a value of a sample in an enhanced layer may be corrected by using a value of the sample in the base layer. A relevant exemplary embodiment will be described with reference to FIG. 4.

The decoder 22 according to an exemplary embodiment may determine bands by dividing a total range of a sample value into signaled intervals or predetermined intervals, and determine a filter parameter set based on a band including a value of the first sample from among the bands. The value of the first sample may include a luma sample value (Y) or a value of a chroma sample (U or V).

When determining the filter parameter set, the decoder 22 according to an exemplary embodiment may reference an interval that includes a sample value. For example, the decoder 22 may determine a filter parameter set that corresponds to a band that includes the sample value as a filter parameter set for correcting the sample value, from among filter parameter sets that respectively correspond to the bands that are determined by dividing a total range of sample values into signaled intervals or predetermined intervals.

According to an exemplary embodiment, the filter parameter sets may be stored in advance. As another example, the video decoding apparatus 20 may receive the filter parameter sets via signaling. The video decoding apparatus 20 may select a filter parameter set from among the received filter parameter sets and use the selected filter parameter set for performing correction. For example, the video decoding apparatus 20 may select a filter parameter set to be used for correction from among the received filter parameter sets, based on a parameter p that is used to select the filter parameter set.

For example, when a sample has a value between 0 and 255, a sample value may be expressed as an integer between 0 and 255. When the sample value is a luma sample value, brightness of the sample may be one among 0 and 255.

A total range of a predetermined sample value may be divided into signaled intervals or predetermined intervals. The total range of the sample value may be divided into a plurality of bands. For example, when the total range of the sample value is from 0 to 255 and a width of each of the bands is 8, the total range of the sample value may include 32 bands.

The decoder 22 may determine a band, in which a sample value is located, from among the plurality of bands. The decoder 22 may determine the filter parameter set according to a location of a band including the sample value from among the bands.

For example, different filter parameter sets may respectively correspond to the plurality of bands. A filter parameter set that corresponds to a band including the sample value may be used to correct the sample value.

As another example, an identical filter parameter set may correspond to some bands from among the plurality of bands. When a first band including a value of the first sample and a second band including a value of the second sample correspond to the same filter parameter set, the values of the first sample and the second sample may be filtered by the same filter.

The band will be described below with reference to FIG. 6A.

The video decoding apparatus 20 according to an exemplary embodiment may receive the filter parameter sets that correspond to the bands from an external source. Then, from among the received filter parameter sets, the decoder 22 may determine a filter parameter set that corresponds to the band including the value of the first sample as a filter parameter set that is used to correct the value of the first sample.

The filter parameter set may be determined based on a plurality of conditions.

The filter parameter set according to an exemplary embodiment may be determined based on a location of an image of a block including a correction target sample. Relevant exemplary embodiment will be described with reference to FIG. 5.

The filter parameter set according to an exemplary embodiment may be determined based on a location of a sub-pixel unit sample that is used in a resampling process. For example, the filter parameter set may be determined according to a location of a sub-pixel unit sample in an image of a correction target sample.

The filter parameter set according to an exemplary embodiment may be determined based on values of samples located near the correction target sample. The video decoding apparatus 20 may compare the values of the samples near the correction target sample and determine edge features, and determine a filter parameter set for correcting a value of the correction target sample, from among filter parameter sets that are classified according to edge features.

The decoder 22 according to an exemplary embodiment may determine a filter parameter set used for correcting the value of the first sample, from among filter parameter sets that correspond to blocks configuring a current image.

For example, the filter parameter sets may respectively correspond to the blocks that configure the current image.

As another example, the decoder 22 may determine the filter parameter set used for correcting the value of the first sample, based on a band including the value of the first sample and a location of a block including the first sample in an image.

The filter parameter set may be determined in advance or signaled via a bitstream.

For example, the video decoding apparatus 20 may transmit the filter parameter sets that correspond to the bands via a PPS. As another example, the video decoding apparatus 20 may transmit the filter parameter sets that correspond to the bands via a VPS or a SPS.

The decoder 22 according to an exemplary embodiment may use the filter parameter set determined by using the above method, filter a value of the at least one second sample determined by the sample determiner 21, and correct the value of the first sample by using a value obtained by filtering.

The decoder 22 may use a color component that is different from a sample corrected when correcting a sample value.

For example, at least one selected from the luma sample value and the chroma sample value may be used to correct the luma sample value. As another example, at least one selected from the luma sample value and the chroma sample value may be used to correct the chroma sample value.

In the present specification, 'Ch' indicates an input chroma signal, $\widehat{Ch}$ indicates a corrected output chroma signal, 'Luma' indicates an input luma signal, $\widehat{Luma}$ indicates a corrected output luma signal, {f(i,j,p)} indicates a filter parameter set for correcting a chroma sample value by using a luma sample value, {$f_{Ch}$(i,j,p)} indicates a filter parameter set for correcting a luma sample value by using a chroma sample value, 'p' indicates a parameter determining a certain filter parameter set from among a plurality of filter parameter sets, and 'M(p),' 'M_Cb(p),' and 'M_Cr(p)' may indicate a multiplication coefficient that is determined according to p. Also, 'M(p),' 'M_Cb(p),' and 'M_Cr(p)' may be integers.

Values of M may be predetermined. Alternatively, the values of M may be received by the video decoding apparatus 20 via signaling, and the video decoding apparatus 20 may select M(p) from among the received values of M and perform correction. Based on the parameter p, the video decoding apparatus 20 may select M(p) to be used for correction, from among the received values of M.

Therefore, even when correcting values of samples located at different blocks or different bands, if a value of p is identical, an identical M(p) value may be used to perform decoding.

M indicates a scale of filter parameters. For example, M may determine a range of a value that a signaled filter parameter may have. M may indicate a scale of a sample value that is filtered by using a filter parameter. M may be signaled via a bitstream or predetermined.

Bit shifting rightward by a shift value may be referred to as a de-scaling shift.

According to an exemplary embodiment, the shift value may be a predetermined value. For example, when the shift value may be 16, a bit shift operation may be performed rightward by 16 bits. Alternatively, the shift value may be a variable.

The shift value may be signaled by at least one selected from a VPS, a SPS, and a PPS. For example, the shift value may be signaled via a first slice segment header in picture units.

Also, according to an exemplary embodiment, 'clip' may refer to a function that performs clipping of an input signal. For example, 'clipping' may refer to an operation of transforming an input signal into a signal corresponding to 0 to 255, and matching 0 to a signal corresponding to a value less than 0 and matching 255 to a signal corresponding to a value greater than 255.

Also, x and y may indicate coordinates of a location of a chroma sample in a filter application space, and $\xi$ and $\zeta$ may indicate coordinates of a location of a chroma sample in a reference space.

For example, (x, y) may indicate coordinates of a chroma sample on an enhanced layer, and ($\xi,\zeta$) may indicate coordinates of a chroma sample on a base layer. According to an exemplary embodiment, when inter-layer filtering is performed, the current space may be the enhanced layer, and the reference space may be the base layer.

When the luma sample and the chroma sample are at layers with an identical resolution, $\xi$=x and $\zeta$=y may be satisfied. When the luma sample and the chroma sample are at layers with different resolutions, $\xi$=x*W_ref/W_cur and $\zeta$=y*H_ref/H_cur may be satisfied. Here, W_ref*H_ref may indicate an image size of a reference layer, and W_cur*H_cur may indicate an image size of a current layer. Also, in this case, W_ref*H_ref may indicate a luma image size of the reference layer, and W_cur*H_cur may indicate a luma image size of the current layer.

In the present specification, $\delta$ and $\epsilon$ may indicate variables that are used to determine luma samples related to an identical chroma sample.

According to an exemplary embodiment, ranges of parameters 'i' or 'j', which indicate filtering target samples, may be signaled via a bitstream or determined in advance.

For example, respective ranges of j and i may be "−1≤j≤2" and "−1≤i≤1." An exemplary embodiment relevant to the range of j and i will be described with reference to FIGS. 3A to 3F.

The decoder 22 according to an exemplary embodiment may correct a chroma sample value by using Equation (1).

$$\widehat{Ch}(x, y) = \text{Clip}\left(Ch(x, y) + \left(M(p)\sum_{j,i} f(i, j, p)\text{Luma}(2\xi + i, 2\zeta + j) + \text{offset}\right) \gg \text{Shift}\right) \quad \text{[Equation (1)]}$$

Coordinates are "2$\xi$+i, 2$\zeta$+j" in Luma(2$\xi$+i, 2$\zeta$+j) because a plurality of luma samples may correspond to a single chroma sample.

For example, coordinates of a luma sample that corresponds to a chroma sample with coordinates of (5, 7) at a base layer may be (10+0,14+0), (10+1,14+0), (10+0,14+1), and (10+1,14+1).

Equation (1) according to an exemplary embodiment will be described below. In order to obtain a corrected chroma sample value ($\widehat{Ch}$ (x,y)) at an enhanced layer, the decoder 22 may add a filtered value to a non-corrected chroma sample value (Ch(x,y)) at the enhanced layer, bit shift the result of adding rightward by a shift, and clip the result of shifting.). Chroma coordinates ($\xi,\zeta$) of a base layer may be performed when filtering. The decoder 22 may perform filtering by using a value obtained by multiplying a filter parameter set (f(i,j,p)) to a luma sample value corresponding to coordinates (2$\xi$+i, 2$\zeta$+j), as shown in Equation (1).

The decoder 22 may decode by using Equation (2), which is obtained by multiplying a weight a(i,j) in front of f(i,j,p) of Equation (1).

$$\widehat{Ch}(x, y) = \text{Clip}\left(Ch(x, y) + \left(M(p)\sum_{j,i} a(i, j)f(i, j, p)\text{Luma}(2\xi + i, 2\zeta + j) + \text{offset}\right) \gg \text{Shift}\right) \quad \text{[Equation (2)]}$$

According to an exemplary embodiment, a(i,j) may be a predetermined integer matrix. Alternatively, a(i,j) may be integers that are adaptively signaled via a bitstream. By multiplying a weight to a filter parameter, the filter parameter may be efficiently encoded. Alternatively, multiplying a weight to a filter parameter may improve a regulation procedure performed by the video encoding apparatus 10 when searching for a filter parameter.

According to another exemplary embodiment, the decoder 22 may correct a luma sample value by using Equation (3).

[Equation (3)]

$$\widehat{Luma}(2x+\delta, 2y+\varepsilon) = $$
$$\text{Clip}\left(\text{Luma}(2x+\delta, 2y+\varepsilon) + \left(M_{Cb}(p)\sum_{ij} f_{Cb}(i,j,p)Cb(\xi+i, \zeta+j) + M_{Cr}(p)\sum_{ij} f_{Cr}(i,j,p)Cr(\xi+i, \zeta+j) + \text{offset}\right) \gg \text{Shift}\right)$$

According to an exemplary embodiment, f_Cb(i,j,p) may indicate a filter parameter set that is used to filter a Cb component. f_Cr(i,j,p) may indicate a filter parameter set that is used to filter a Cr component. M_Cb(p) is a multiplication parameter for filtering the Cb component, and may be an integer determined according to p. M_Cr(p) is a multiplication parameter for filtering the Cr component, and may an integer determined according to p.

The decoder 22 may determine coordinates of the luma sample by using coordinates (x, y) of the chroma sample. The decoder 22 may use variables δ and ε to determine the coordinates of the luma sample.

For example, the decoder 22 may determine the coordinates of the luma sample at the enhanced layer as (2x+δ, 2y+ε) by using coordinates of the chroma sample and the variables δ and ε.

Equations (4), (5), and (6) below may be a general form of Equations (1) and (3).

The decoder 22 according to an exemplary embodiment may correct the chroma sample value by using Equation (4).

[Equation (4)]

$$\widehat{Cb}(x, y) = $$
$$\text{Clip}\left(Cb(x, y) + \left(M(p)\left(\sum_{j,i} f(i, j, p)\text{Luma}(2\xi+i, 2\zeta+j) + f_{Cb\_Cb}(i, j, p)\right.\right.\right.$$
$$\left.\left.\left.Cb(\xi, \zeta) + f_{Cb\_Cr}(i, j, p)Cr(\xi, \zeta)\right) + \text{offset}\right) \gg \text{Shift}\right)$$

As shown in Equation (4), the decoder 22 according to an exemplary embodiment may correct the chroma sample value by using the not only luma sample value but also the chroma sample value.

The decoder 22 may determine a corrected Cb sample value by correcting Cb(x,y), which is a non-corrected Cb sample value.

As shown in Equation (4), the decoder 22 according to an exemplary embodiment may correct the Cb sample value by using a luma sample value multiplied by a filter parameter set (f(i,j,p)*Luma(2ξ+i,2ζ+j)), a Cb sample multiplied by a filter parameter set (f_Cb_Cb(i,j,p)*Cb(ξ,ζ)), and a Cr sample value multiplied by a filter parameter set (f_Cb_Cr(i,j,p)*Cr(ξ,ζ)).

The decoder 22 according to another exemplary embodiment may correct the chroma sample by using Equation (5).

[Equation (5)]

$$\widehat{Cr}(x, y) = $$
$$\text{Clip}\left(Cr(x, y) + \left(M(p)\left(\sum_{j,i} f(i, j, p)\text{Luma}(2\xi+i, 2\zeta+j) + f_{Cr\_Cb}(i, j, p)\right.\right.\right.$$
$$\left.\left.\left.Cb(\xi, \zeta) + f_{Cr\_Cr}(i, j, p)Cr(\xi, \zeta)\right) + \text{offset}\right) \gg \text{Shift}\right)$$

As shown in Equation (5), the decoder 22 according to an exemplary embodiment may correct the chroma sample value by using not only the luma sample value but also the chroma sample value.

The decoder 22 may determine a corrected Cr sample value by correcting a non-corrected Cr sample value Cr(x,y).

As shown in Equation (5), the decoder 22 according to an exemplary embodiment may correct the Cr sample value by using a luma sample value multiplied by a filter parameter set (f(i,j,p)*Luma(2ξ+i,2ζ+j)), a Cb sample value multiplied by a filter parameter set (f_Cr_Cb(i,j,p)*Cb(ξ,ζ)), and a Cr sample value multiplied by a filter parameter set (f_Cr_Cr(i,j,p)*Cr(ξ,ζ)).

The decoder 22 according to another exemplary embodiment may correct the luma sample value by using Equation (6).

[Equation (6)]

$$\widehat{Luma}(2x+\delta, 2y+\varepsilon) = $$
$$\text{Clip}\left(\text{Luma}(2x+\delta, 2y+\varepsilon) + \left(M_{Cb}(p)\sum_{ij} f_{Cb}(i,j,p)Cb(\xi+i, \zeta+j) + M_{Cr}(p)\sum_{ij} f_{Cr}(i,j,p)Cr(\xi+i, \zeta+j) + \text{offset}\right) \gg \text{Shift}\right)$$

As shown in Equation (6), the decoder 22 according to an exemplary embodiment may correct the luma sample value by using not only the chroma sample value but also the luma sample value.

The decoder 22 may determine a corrected luma sample value ($\widehat{Luma}(2x+\delta, 2y+\varepsilon)$) by correcting a non-corrected luma sample value Luma(2x+δ,2+ε).

As shown in Equation (6), the decoder 22 according to an exemplary embodiment may correct the luma sample value by using a luma sample value multiplied by a filter parameter set (f(i,j,p)*Luma(2ξ+i,2ζ+j)), a Cb sample value multiplied by a filter parameter set (f_Cr_Cb(i,j,p)*Cb(ξ,ζ)), and a Cr sample value multiplied by a filter parameter set (f_Cr_Cr(i,j,p)*Cr(ξ,ζ)).

Variables and functions of Equations (7) and (8) will be described below.

'Lut' is an acronym for 'look-up-table.' Lut may output filter parameters that correspond to an input. For example, Lut may be used as in the form of LutY[yIdx][uIdx][vIdx][vertex].

'Index' may represent a value that indicates the number of a band in the case that a range of a sample value is divided into bands.

In a color space, 'yIdx' may indicate an index at a Y-axis, 'uIdx' may indicate an index at a U-axis, and 'vIdx' may indicate an index at a V-axis. According to an exemplary embodiment, the term 'vertex' may indicate a vertex that corresponds to a location on the color space. For example, the vertex may represent one of four vertices that has a value between 0 and 3 and corresponds to a location on a color space. The color space will be further described below with reference to FIG. 6B.

According to an exemplary embodiment, LutY[6][7][8][0] may indicate at least one filter parameter that is applied to a luma sample value that corresponds to a first vertex from among four vertices corresponding to a color space corresponding to a $7^{th}$ index at the Y-axis, an $8^{th}$ index at the U-axis, and a $9^{th}$ index at the V-axis.

As another example, 'Lut' may be used as in the form of LutC[yIdx][uIdx][vIdx][vertex]. According to an exemplary embodiment, LutC[4][5][3][1] may indicate at least one filter parameter that is applied to a chroma sample value that corresponds to a second vertex from among four vertices corresponding to a color space corresponding to a $5^{th}$ index at the Y-axis, a $6^{th}$ index at the U-axis, and a $3^{rd}$ index at the V-axis.

As another example, when X is one of Y, U, and V, LutX according to an exemplary embodiment may be LutX[yIdx][uIdx][vIdx][vertex]=(res_x[yIdx][uIdx][vIdx][vertex]<<cm_res_quant_bits)+predXa[yIdx][uIdx][vIdx][vertex]+predXb[yIdx][uIdx][vIdx][vertex]. In this case, predXa[yIdx][uIdx][vIdx][vertex] and predXb[yIdx][uIdx][vIdx][vertex] may be prediction values that are determined according to yIdx, uIdx, vIdx, and vertex.

'delta' may indicate an error value. For example, deltaY=rlPicSampleY[xP][yP]−(yIdx<<yShift2Idx), which may be expressed as deltaY=Y[xP][yP]−((Y[xP][yP]>>yShift2Idx)<<yShift2Idx). 'deltaY' may indicate a value obtained by subtracting a luma sample with coordinates (xP,yP), which is bit shifted rightward by yShift2Idx and bit shifted leftward again, from the luma sample with the coordinates (xP,yP). Therefore, deltaY may indicate an error that occurs during bit shifting. According to an exemplary embodiment, rlPicSampleY[xP][yP] is a luma sample value with coordinates (xP, yP).

According to an exemplary embodiment, yShift2Idx may satisfy "yShift2Idx=CMInputBitDepth_Y−cm_octant_depth−cm_ypart_num_log 2." According to an exemplary embodiment, CMInputBitDepth_Y may indicate bit depth of the luma sample which is input when performing color mapping.

As another example, deltaU=uTemp−(uIdx−uShift2Idx) may be satisfied, and uTemp=(SF_Cb[i,j]*Cb[x+i][y+j]+4)>>3 may be satisfied. (x, y) may indicate coordinates of the chroma sample, and 'i' and 'j' may indicate variables used to determine a function of the chroma sample value F_Cb.

According to an exemplary embodiment, cShift2Idx may satisfy "cShift2Idx=CMInputBitDepth_C−cm_octant_depth." According to an exemplary embodiment, CMInputBitDepth_C may indicate bit depth of the chroma sample that is input when performing color mapping. According to an exemplary embodiment, uShift2Idx may be equal to cShift2Idx.

As another example, deltaV=vTemp−(vIdx−vShift2Idx) may be satisfied. In this case, vTemp=(SF_Cr[i,j]*Cr[x+i][y+j])>>3 or vTemp=(SF_Cr[i,j]*Cr[x+i][y+j]+4)>>3. (x, y) may indicate coordinates of a chroma sample, and 'i' and 'j' may indicate variables that determine a function of the chroma sample value F_Cr.

According to an exemplary embodiment, cShift2Idx may satisfy "cShift2Idx=CMInputBitDepth_C−cm_octant_depth." According to an exemplary embodiment, CMInputBitDepth_C may represent bit depth of the chroma sample that is input when performing color mapping. According to an exemplary embodiment, uShift2Idx may be equal to cShift2Idx.

nMappingOffset may represent an offset value for color mapping.

nMappingShift may represent a bit shift value for color mapping.

The decoder 22 according to an exemplary embodiment may correct the luma sample value by using Equation (7). Therefore, Equation (7) may partially include Equations (3) and Equation (6) that are used for correcting the luma sample value.

$$cmLumaSample=LutY[yIdx][uIdx][vIdx][0]+$$

$$((((deltaY*(LutY[yIdx][uIdx][vIdx][3]-LutY[yIdx][uIdx][vIdx][2]))<<cShift2Idx)$$

$$+((deltaU*(LutY[yIdx][uIdx][vIdx][1]-LutY[yIdx][uIdx][vIdx][0]))<<yShift2Idx)$$

$$+((deltaV*(LutY[yIdx][uIdx][vIdx][2]-LutY[yIdx][uIdx][vIdx][1]))<<yShift2Idx)$$

$$+nMappingOffset)>>nMappingShift) \quad\quad [\text{Equation (7)}]$$

Equation (7) may provide a method of determining the luma sample value when performing color mapping.

Variables used in Equation (7) have been described above. As shown in Equation (7), the video decoding apparatus 20 may determine the luma sample value that corresponds to a location of (yIdx, uIdx, vIdx) by using LutY that is a lookup table related to the luma sample value.

The decoder 22 according to an exemplary embodiment may correct the luma sample value by using Equation (8). Therefore, Equation (8) may partially include Equations (1), (4), and (5) that are used to correct the luma sample value.

$$cmChromaSample=LutC[yIdx][uIdx][vIdx][0]+$$

$$((((deltaY*(LutC[yIdx][uIdx][vIdx][3]-LutC[yIdx][uIdx][vIdx][2]))<<cShift2Idx)$$

$$+((deltaU*(LutC[yIdx][uIdx][vIdx][1]-LutC[yIdx][uIdx][vIdx][0]))<<yShift2Idx)$$

$$+((deltaV*(LutC[yIdx][uIdx][vIdx][2]-LutC[yIdx][uIdx][vIdx][1]))<<yShift2Idx)$$

$$+nMappingOffset)>>nMappingShift) \quad\quad [\text{Equation (8)}]$$

Equation (8) may provide a method of determining the chroma sample value when performing color mapping.

Variables used in Equation (8) have been described above. As shown in Equation (8), the video decoding apparatus 20 may determine the chroma sample value that corresponds to a location of (yIdx, uIdx, vIdx) by using LutC that is a lookup table related to the chroma sample value.

Relevant variables are further described below.

In order to perform color mapping, the video decoding apparatus 20 according to an exemplary embodiment may obtain at least one selected from 'cm_octant_depth,' 'cm_y_part_num_log 2,' and 'cm_res_quant_bits' as a u(2) function from the bitstream. The u(2) function may indicate a function that reads 2 bits from a bitstream and interprets a first bit as MSB.

An exemplary embodiment of the video decoding apparatus 20 obtaining at least one selected from cm_octant- _depth, cm_y_part_num_log 2, and cm_res_quant_bits in order to perform color mapping is shown by using a pseudo code as below.

| colour_mapping_table( ) { | Descriptor |
|---|---|
| cm_octant_depth | u(2) |
| cm_y_part_num_log2 | u(2) |
| cm_res_quant_bits | u(2) |
| colour_mapping_octants( 0, 0, 0, 0, 1 << cm_octant_depth ) | |
| } | |

A color space may be split when performing color mapping. Also, when splitting the color space, the number of splits may indicate depth. Here, 'cm_octant_depth' may represent the number of the above-described bands. Therefore, cm_octant_depth may indicate the maximum split depth, and when a current depth is less than cm_octant_depth, a current color space may be split into octants.

An exemplary embodiment of the video decoding apparatus 20 splitting the current color space for color mapping when the current depth is less than cm_octant_depth is shown by using a pseudo code as below.

| colour_mapping_octants( depth, yIdx, uIdx, vIdx, length ) | Descriptor |
|---|---|
| if ( depth < cm_octant_depth ) | |
| split_octant_flag | u(1) |

The video decoding apparatus 20 may determine whether the current depth is greater than cm_octant_depth, and split the color space when cm_octant_depth is greater than the current depth.

An exemplary embodiment of the octants will be described below with reference to FIG. 6C.

According to an exemplary embodiment, cm_octant_depth may represent the maximum split depth of a color mapping table. According to an exemplary embodiment, cm_octant_depth may range from 0 to 1.

According to an exemplary embodiment, cm_octant_depth may satisfy "COctantNum=1<<cm_octant_depth." According to an exemplary embodiment, 'COctantNum' may represent the number of octants in a chroma portion of the color space.

'cm_y_part_num_log 2' may indicate the number of blocks in an image. Alternatively, 'cm_y_part_num_log 2' may indicate the number of split parts of the color space.

For example, 'cm_y_part_num_log 2' may indicate the number of partitions of a minimum color mapping table octant related to the luma sample. According to an exemplary embodiment, cm_y_part_num_log 2 may range from 0 to 2.

According to an exemplary embodiment, cm_octant_depth and cm_y_part_num_log 2 may satisfy "YOctantNum=1<<(cm_octant_depth+cm_y_part_num_log 2)."

According to an exemplary embodiment, 'YOctantNum' may indicate the number of octants at a luma portion of the color space.

According to another exemplary embodiment, cm_y_part_num_log 2 may satisfy "YPartNum=1<<cm_y_part_num_log 2."

According to an exemplary embodiment, 'YPartNum' may indicate the number of partitions in the luma portion of the color space.

'cm_res_quant_bits' may indicate quantization bits. The video decoding apparatus 20 according to an exemplary embodiment may receive a quantization bit. For example, when the quantization bit is b during transmission of M, a value (M>>b) that is obtained by shifting M rightward by b may be used.

The quantization bit may be determined in advance, or determined based on a quantization parameter (QP) of a slice.

Alternatively, the quantization bit may be a signaled value. For example, the video decoding apparatus 20 may receive the quantization bit via at least one selected from PPS, VPS, and SPS.

The filter parameter may be derived by using res_y[yIdx][uIdx][vIdx][vertex], res_u[yIdx][uIdx][vIdx][vertex], and res_v[yIdx][uIdx][vIdx][vertex]. yIdx, uIdx, vIdx, and vertex have been described above.

According to an exemplary embodiment, 'cm_res_quant_bits' may represent the number of least significant bits (LSBs) that are added to vertex residual values res_y, res_u, and res_v.

According to an exemplary embodiment, res_y[yIdx][uIdx][vIdx][vertex] may represent a prediction residual of the luma sample of a vertex with an index of [yIdx][uIdx][vIdx][vertex].

According to an exemplary embodiment, res_u[yIdx][uIdx][vIdx][vertex] may represent a prediction residual of a Cb component of a vertex with an index of [yIdx][uIdx][vIdx][vertex].

According to an exemplary embodiment, res_v[yIdx][uIdx][vIdx][vertex] may represent a prediction residual of a Cr component of a vertex corresponding to [yIdx][uIdx][vIdx][vertex].

Each of the exemplary embodiments will be described below with reference to FIGS. 7A to 7C. The video decoding apparatus 20 according to an exemplary embodiment may include a central processor (not shown) that generally controls the sample determiner 21 and the decoder 22. Alternatively, the video decoding apparatus 20 may generally operate according to interactions of the processors (not shown). Alternatively, the sample determiner 21 and the decoder 22 may be controlled according to the control of an external processor (not shown) of the video decoding apparatus 20.

The video decoding apparatus 20 according to an exemplary embodiment may include one or more data storage units (not shown) in which input and output data of the sample determiner 21 and the decoder 22 is stored. The video decoding apparatus 20 may include a memory control unit (not shown) that observes data input and output of the data storage units (not shown).

The video decoding apparatus 20 according to an exemplary embodiment may operate in connection with an internal video decoding processor or an external video decoding processor so as to output video decoding results, thereby performing a video decoding operation including transformation. Not only a separate processor, but also the video decoding apparatus 20, a central processor, or a graphic processor may include a video decoding processing module so that the internal video decoding processor of the video decoding apparatus 20 the internal video decoding processor of the video decoding apparatus 10 may perform basic video decoding. Hereinafter, various exemplary embodiments of filter operations that may be performed by the video decoding apparatus 20 according to an exemplary embodiment will be described with reference to FIGS. 2B to 7.

Figure 2B:
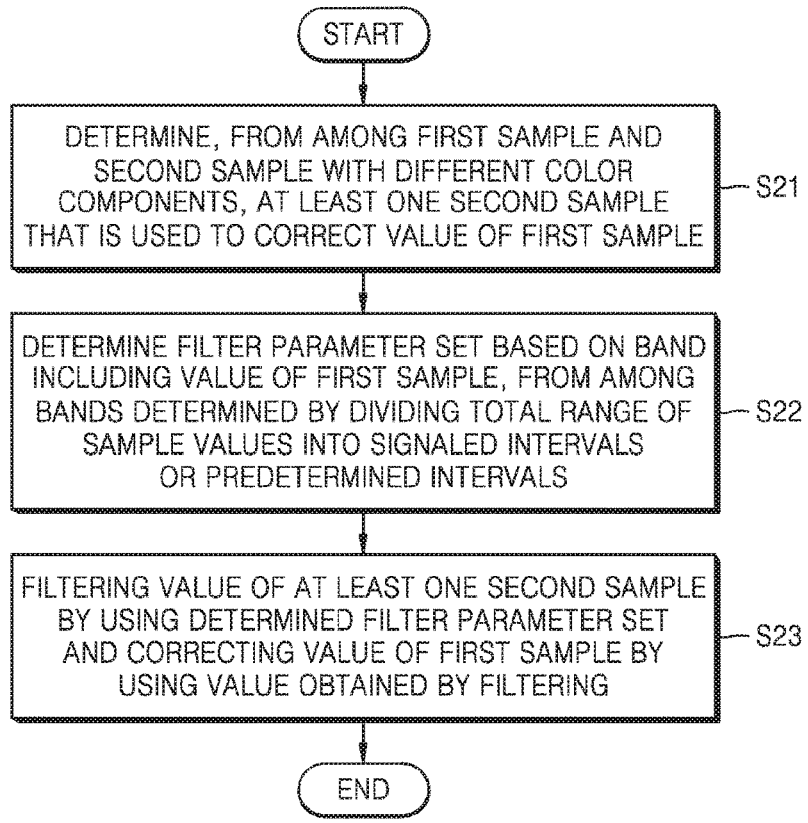
FIG. 2B is a flowchart of a video decoding method, according to various exemplary embodiments.

FIG. 2B is a flowchart of a video decoding method, according to various exemplary embodiments.

Hereinafter, the video decoding method assumes that a first sample is any one of a luma sample and a chroma sample, and a second sample is any one of the luma sample and the chroma sample which is not the first sample.

In operation S21, the sample determiner 21 may determine at least one second sample that is used to correct the first sample from among the first sample and the second sample having different color components.

The sample determiner 21 may determine at least one second sample that is located in an area corresponding to a location of the first sample.

The first sample and the second sample may have different resolutions. For example, the second sample may be a sample in a base layer, and the first sample may be a sample in an enhanced layer. As another example, the second sample may be a non-upsampled sample, and the first sample may be an upsampled sample.

In operation S22, the decoder 22 may determine bands by dividing a total range of a sample value into signaled intervals or predetermined intervals, and determine a filter parameter set according to a band including a value of the first sample from among the bands. As described above, the value of the first sample may be a luma sample value (Y) or a value of a chroma sample (U or V).

Alternatively, the decoder 22 may determine bands by dividing a total range of a sample value into signaled intervals or predetermined intervals, and from among filter parameter sets that respectively correspond to the determined bands, determine a filter parameter set, which corresponds to a band including the sample value, as a filter parameter set for correcting the sample value.

The decoder 22 according to an exemplary embodiment may receive filter parameter sets corresponding to the bands from an external source. Also, from among the received filter parameter sets, the decoder 22 may determine a filter parameter set that corresponds to the band including the sample value as a filter parameter set for correcting the sample value.

The decoder 22 according to another exemplary embodiment may determine a filter parameter set for correcting the sample value, from among the filter parameter sets that correspond to blocks configuring a current image.

For example, the filter parameter sets may respectively correspond to the blocks that configure the current image.

As another example, the decoder 22 may determine the filter parameter set used for correcting a value of the first sample, based on a band including the value of the first sample and a location of a block including the first sample in an image.

The filter parameter set may be determined in advance or signaled via a bitstream. For example, the video decoding apparatus 20 may transmit the filter parameter sets that correspond to the bands via a PPS. As another example, the video decoding apparatus 20 may transmit the filter parameter sets that correspond to the bands via at least one selected from a VPS or a SPS.

In operation S23, the decoder 22 filters a value of the at least one second sample determined in operation S21 by using the filter parameter set determined in operation S22, and correct the value of the first sample by using a value obtained by filtering.

The decoder 22 may use a color component that is different from a sample corrected when correcting a sample value.

Also, the decoder 22 may correct a value of a correction target sample by using Equations (1) to (8), as described above.

FIGS. 3A to 3F show various exemplary embodiments of correcting a sample value in the case that a sampling format is 4:2:0. However, the sampling format is not limited to 4:2:0, and various sampling formats may be applied.

Also, in FIGS. 3A to 3F, a star shape may represent a chroma sample, and an oval shape may represent a luma sample.

Figure 3A:
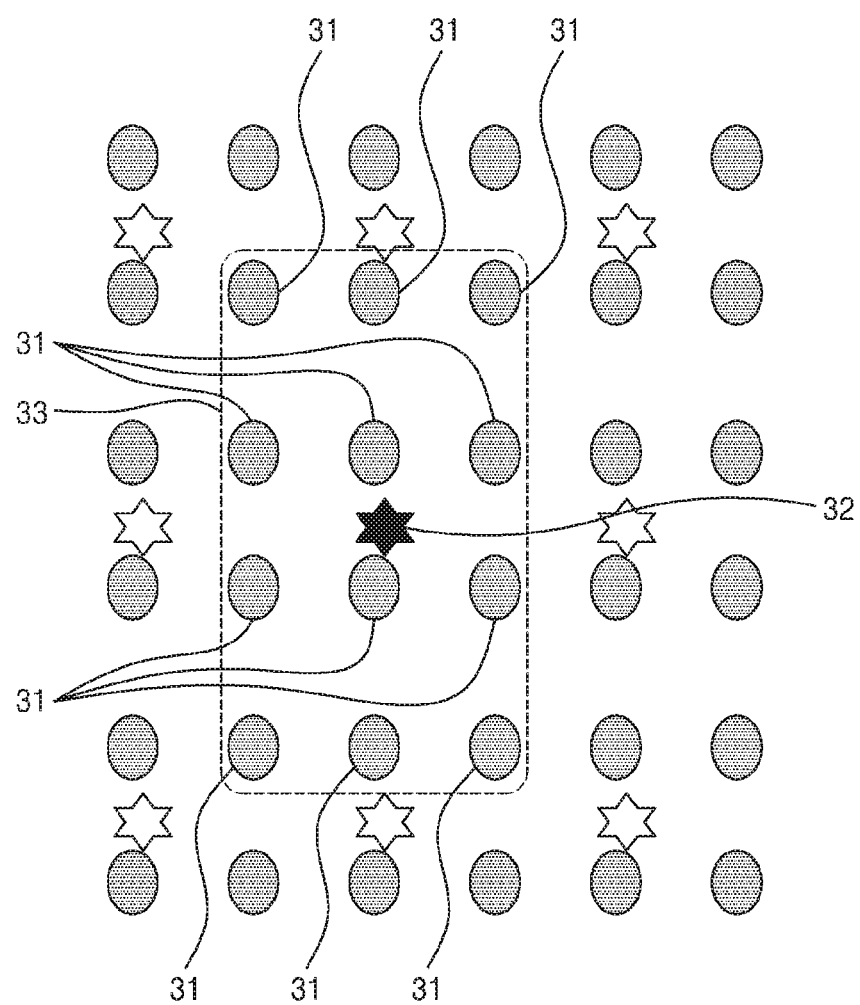
FIGS. 3A, 3B, and 3C illustrate a chroma sample adjusting method, according to various exemplary embodiments.
Figure 3B:
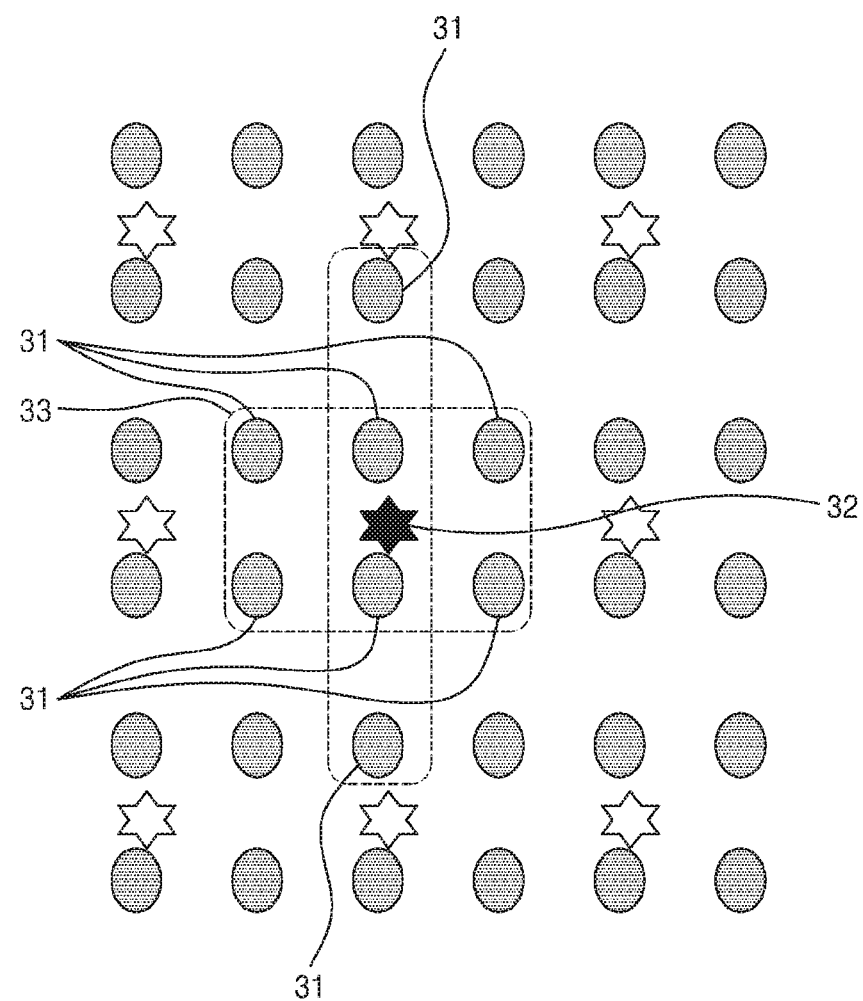
Figure 3C:
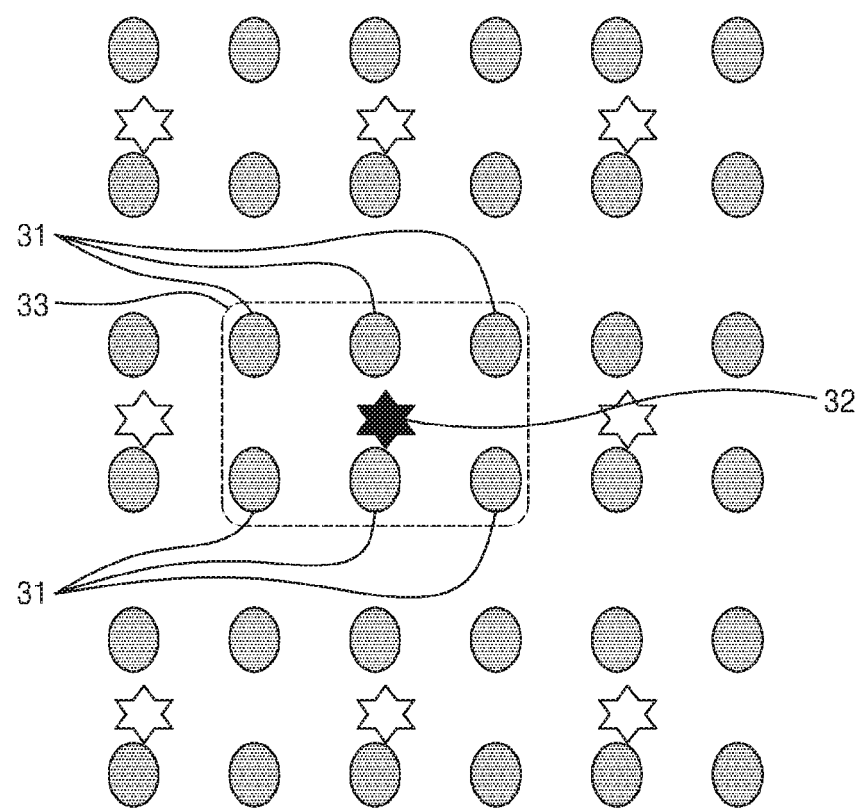

FIGS. 3A, 3B, and 3C may illustrate a chroma sample correction method according to various exemplary embodiments.

According to the exemplary embodiments shown in FIGS. 3A, 3B, and 3C, a first sample may be the chroma sample, and a second sample may be the luma sample.

The video decoding apparatus 20 may correct a chroma sample 32 by using luma samples in a filtering area 33.

The sample determiner 21 may determine, from among luma samples in an image, luma samples 31 that are used to correct the chroma sample 32.

The luma samples in the filtering area 33 may be used to correct the chroma sample 32.

The sample determiner 21 according to an exemplary embodiment may determine the filtering area 33 in advance. For example, the sample determiner 21 may determine a luma sample within a certain distance from the chroma sample 32, i.e., a correction target, as a luma sample used for correction.

Alternatively, the filtering area 33 may vary according to settings. Alternatively, the filtering area 33 may vary according to luma sample values around the chroma sample 32. Alternatively, the filtering area 33 may be determined according to a value of a filter parameter set transmitted from the video encoding apparatus 10. Alternatively, the filtering area 33 may be determined based on information transmitted from the video encoding apparatus 10. Alternatively, the filtering area 33 may be determined as a union of at least two areas, as shown in FIG. 3B. Alternatively, the filtering area 33 may be determined as an intersection of at least two areas.

When the video decoding apparatus 20 corrects a chroma sample value by using at least one selected from Equations (1), (4), and (5), parameters j and i in the exemplary embodiment of FIG. 3A may satisfy "$-1 \le j \le 2$" and "$-1 \le i \le 1$".

When the filtering area 33 is determined as shown in FIG. 3A, the video decoding apparatus 20 according to an exemplary embodiment may correct a value of the chroma sample 32 by performing 4-tap filtering three times. Alternatively, the video decoding apparatus 20 may correct the value of the chroma sample 32 by performing 12-tap filtering once.

When the video decoding apparatus 20 corrects the chroma sample value by using at least one selected from Equations (1), (4), and (5), the parameters j and i in the exemplary embodiment of FIG. 3B may satisfy "$-1 \le j \le 2$" and "i=0", or "$0 \le j \le 1$" and "$i = \pm 1$".

When the video decoding apparatus 20 corrects the chroma sample value by using at least one selected from Equations (1), (4), and (5), the parameters j and i in the exemplary embodiment of FIG. 3C may satisfy "$0 \le j \le 1$" and "$-1 \le i \le 1$".

When the filtering area 33 is determined as shown in FIG. 3C, the video decoding apparatus 20 according to an exemplary embodiment may correct the value of the chroma sample 32 by performing 3-tap filtering twice. Alternatively the video decoding apparatus 20 may correct the value of the chroma sample 32*by* performing 6-tap filtering once.

Figure 3D:
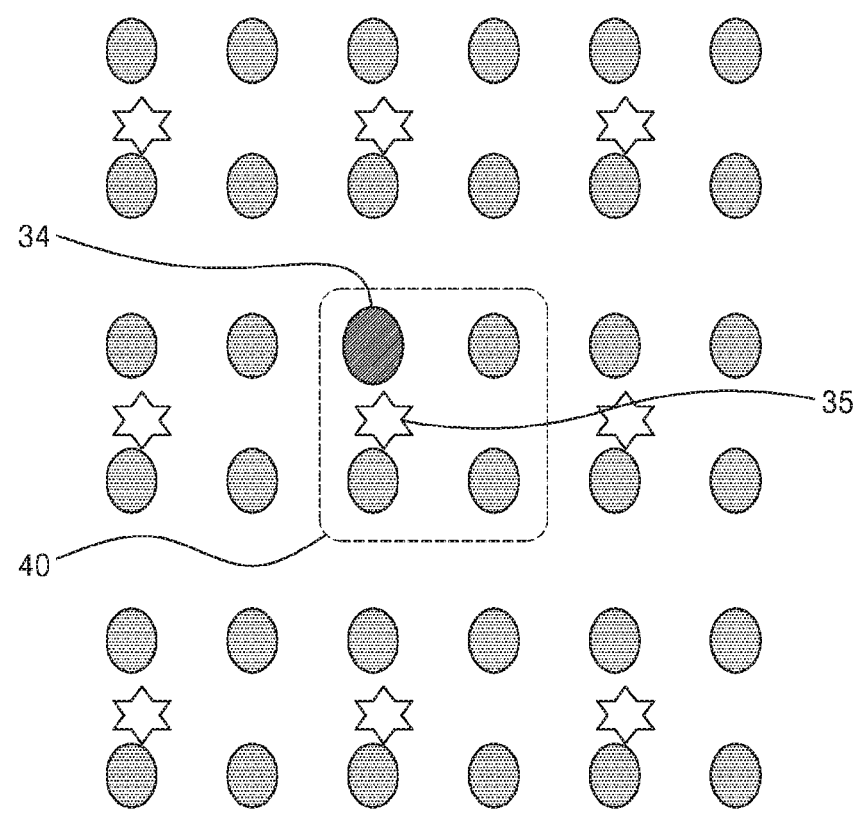
FIGS. 3D, 3E, and 3F illustrate a luma sample adjusting method, according to various exemplary embodiments.
Figure 3E:
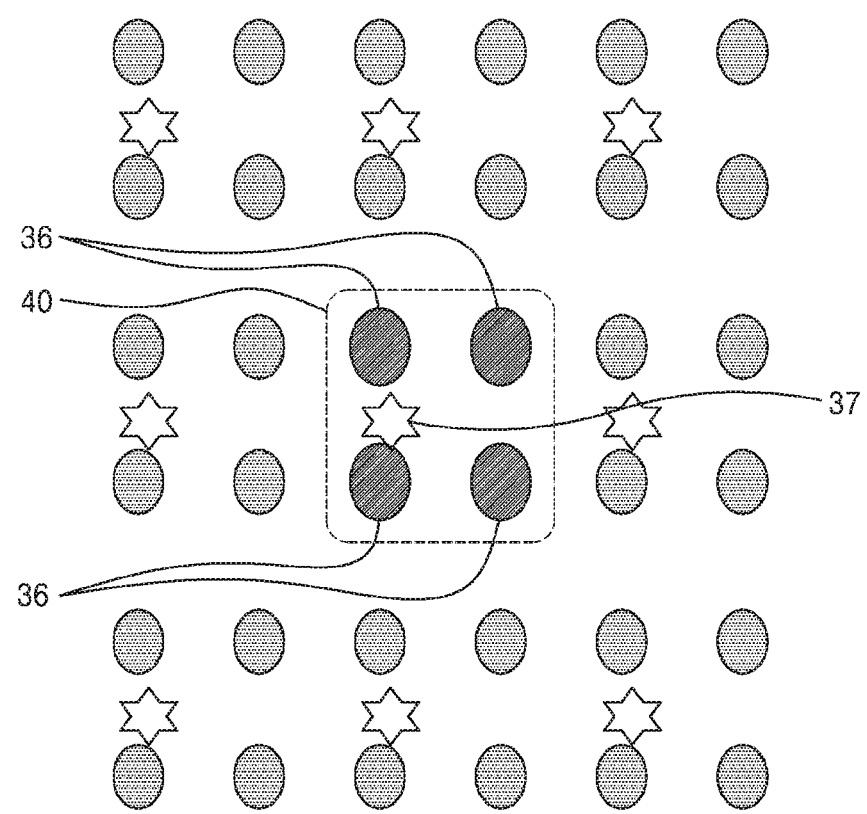
Figure 3F:
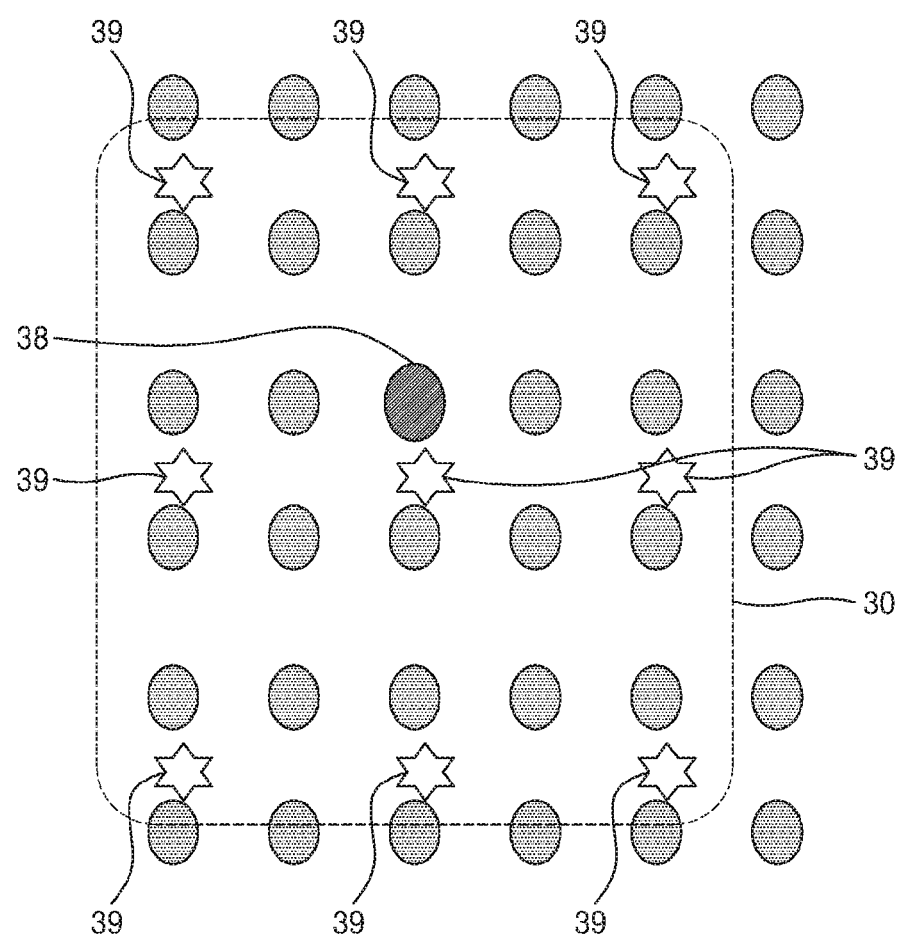

FIGS. 3D, 3E, and 3F show a method of correcting a luma sample, according to various exemplary embodiments.

In the exemplary embodiments of FIGS. 3D, 3E, and 3F, a first sample may be a luma sample, and a second sample may be a chroma sample.

FIG. 3D shows an example in which the video decoding apparatus 20 uses one chroma sample 35 in a filtering area 40 to correct a luma sample.

The video decoding apparatus 20 may correct a luma sample 34, which is a correction target, by using the chroma sample 35 located in the filtering area 40.

From among chroma samples in an image, the sample determiner 21 may determine the chroma sample 35 that is used to correct the luma sample 34.

Chroma samples in the filtering area 40 may be used to correct the luma sample 34.

The sample determiner 21 according to an exemplary embodiment may determine the filtering area 40 in advance. For example, the sample determiner 21 may determine a chroma sample within a certain distance from the luma sample 34 as a chroma sample used for correction.

Alternatively, the filtering area 40 may vary according to settings. Alternatively, the filtering area 40 may vary according to chroma sample values around the luma sample 34. Alternatively, the filtering area 40 may be determined according to a value of a filter parameter set transmitted from the video encoding apparatus 10. Alternatively, the filtering area 40 may be determined based on information transmitted from the video encoding apparatus 10.

However, since one chroma sample corresponds to four luma samples, as shown in FIG. 3E, the video decoding apparatus 20 according to an exemplary embodiment may correct values of luma samples 36 by using an identical chroma sample 37 in the filtering area 40.

FIG. 3F shows an example in which the video decoding apparatus 20 uses a plurality of chroma samples 39 in a filtering area 30 to correct a luma sample.

The video decoding apparatus 20 may correct a luma sample 38, which is a correction target, by using the plurality of chroma samples 39 in the filtering area 30.

From among chroma samples in an image, the sample determiner 21 may determine the chroma samples 39 that are used to correct the luma sample 38.

Chroma samples in the filtering area 30 may be used to correct the luma sample 38. The filtering area 30 may be determined by using various methods.

The sample determiner 21 according to an exemplary embodiment may determine the filtering area 30 in advance. For example, the sample determiner 21 may determine a chroma sample within a certain distance from the luma sample 38 as a chroma sample used for correction.

Alternatively, the filtering area 30 may vary according to settings. Alternatively, the filtering area 30 may vary according to chroma sample values around the luma sample 38. Alternatively, the filtering area 30 may be determined according to a value of a filter parameter set transmitted from the video encoding apparatus 10. Alternatively, the filtering area 30 may be determined based on information transmitted from the video encoding apparatus 10.

Figure 4:
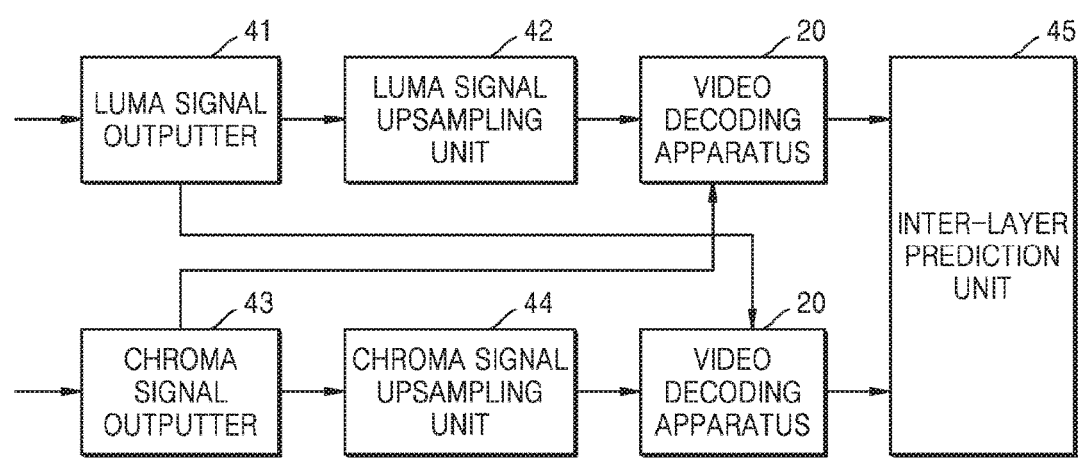
FIG. 4 is a block diagram for describing a video decoding method, according to an exemplary embodiment.

FIG. 4 is a block diagram for describing a video decoding method, according to an exemplary embodiment.

The video decoding apparatus 20 may perform inter-layer prediction on an enhanced layer image for each block such as coding units or prediction units. The video decoding apparatus 20 may reference a block of a base layer image to reconstruct a block of the enhanced layer image.

The video decoding apparatus 20 may use an enhanced layer prediction block, which is determined by using a base layer reconstruction block according to the inter-layer prediction structure, as a reference image for inter-layer prediction of an enhanced layer original block.

In order to determine an enhanced layer prediction image (block) by using a base layer reconstruction image (block) as described above, it is necessary to perform an upsampling operation to enlarge the base layer reconstruction image to a size of the enhanced layer image.

However, a value of upsampled first sample may be corrected by using a value of a second sample of a base layer.

For example, a luma signal outputter 41 may output a luma sample value of a base layer. A luma signal upsampling unit 42 may upsample the luma sample value. The video decoding apparatus 20 may perform decoding by using the upsampled luma sample value. The video decoding apparatus 20 may use a chroma sample value while decoding. When decoding the luma sample value, the video decoding apparatus 20 may correct a luma sample value by using the chroma sample value. Also, the video decoding apparatus 20 may use a chroma sample value of the base layer when correcting the luma sample value by using the chroma sample value.

Since the chroma sample value of the base layer may be directly used when decoding a luma sample value of an enhanced layer or an upsampled luma sample value, no delay may occur due to upsampling of the chroma sample value. The luma sample value decoded by the video decoding apparatus 20 may be transmitted to an inter-layer prediction unit 45 and inter-layer prediction may be performed.

Also, when the video decoding apparatus 20 reconstructs a luma sample value, the video decoding apparatus 20 may perform correction by using a luma sample value other than the luma sample value to be reconstructed. A luma sample other than the luma sample to be reconstructed and used for correction may be a sample of a base layer or a sample of an enhanced layer.

Alternatively, a chroma signal outputter 43 may output the chroma sample value of the base layer. Then, a chroma signal upsampling unit 44 may upsample the chroma sample value. The video decoding apparatus 20 may decode by using the upsampled chroma sample value. The video decoding apparatus 20 may use the luma sample value when decoding. When decoding the chroma sample value, the video decoding apparatus 20 may correct the chroma sample value by using the luma sample value. Also, the video decoding apparatus 20 may use the luma sample value of the base layer when correcting the chroma sample value by using the luma sample value.

Therefore, since the luma sample value of the base layer may be directly used for decoding a chroma sample value of an enhanced layer and an upsampled chroma sample value, no delay may occur due to upsampling of the chroma sample value. Also, the chroma sample value decoded by the video decoding apparatus 20 may be transmitted to the inter-layer prediction unit 45 and inter-layer prediction may be performed.

Also, when the video decoding apparatus 20 reconstructs a chroma sample value, the video decoding apparatus 20 may perform correction by using a chroma sample other than the chroma sample value to be reconstructed. A chroma sample other than the chroma sample to be reconstructed and used for correction may be a sample of a base layer or a sample of an enhanced layer.

Alternatively, the video decoding apparatus 20 may perform cross color filtering, which includes correcting a chroma signal by using at least one selected from a luma signal and a chroma signal or correcting a luma signal by using at least one selected from a luma signal and a chroma signal.

Figure 5A:
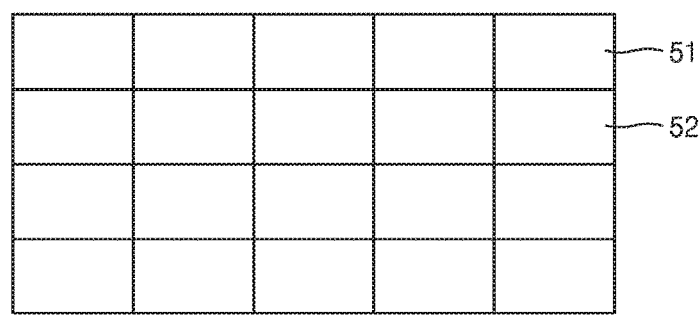
FIGS. 5A, 5B, and 5C illustrate a method of decoding an image split into a plurality of blocks, according to various exemplary embodiments.
Figure 5B:
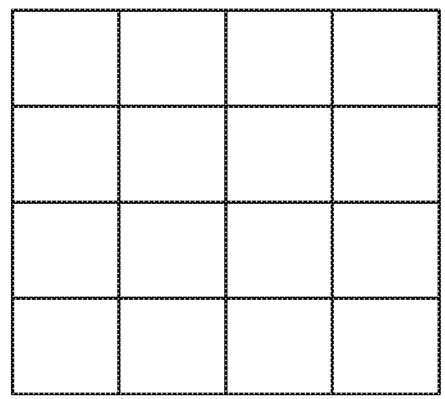
Figure 5C:
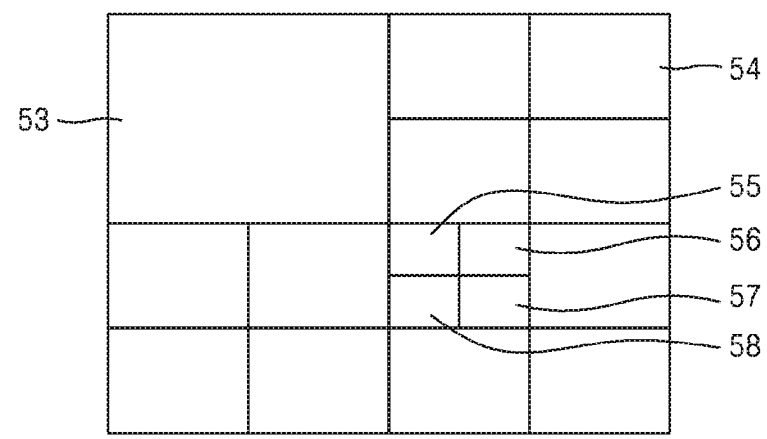

FIGS. 5A, 5B, and 5C illustrate a method of decoding an image split into a plurality of blocks, according to various exemplary embodiments.

An image may include a plurality of blocks. FIGS. 5A, 5B, and 5C show an exemplary embodiment of an image split into a plurality of blocks.

A block may be square-shaped, rectangular-shaped, or have an arbitrary geometrical shape. However, the block is not limited to a certain data size unit. From among coding units according to a tree structure, the block may include a largest coding unit, a coding unit, a prediction unit, a transformation unit, etc. The largest coding unit including coding units having the tree structure may be diversely referred to as a coding tree unit, a coding block tree, a block tree, a root block tree, a coding tree, a coding root, or a tree trunk.

FIGS. 5A and 5B show an image including blocks with an identical size. The filter parameter set may be determined for each block. A parameter p may determine the filter parameter set.

An exemplary embodiment of determining the filter parameter set for each block will be described below.

For example, when a parameter p corresponding to a first block 51 is 1, a filter parameter set {1, 2, 3, 4} may be used to filter a luma sample value of the first block 51. When a parameter p corresponding to a second block 52 is 2, a filter parameter set {2, 3, 4, 5} may be used to filter a luma sample value of the second block 52.

Alternatively, when the parameter p corresponding to the first block 51 is 1, the filter parameter set {1, 2, 3, 4} may be used to filter the luma sample value of the first block 51. When the parameter p corresponding to the second block 52 is 2, the filter parameter set {1, 2, 3, 4} may be used to filter the luma sample value of the second block 52, as in the case of the first block 51.

As shown in FIG. 5C, the blocks included in the image may have different split depths.

Therefore, a third block 53, a fourth block 54, and a fifth block 55 may all have different sizes. When a maximum depth is 3, an example of a bitstream that represents a split form of an image, may be '1, 0, 1, 0, 1, 0, 1, 0, 0, 0', wherein '1' represents splitting and '0' represents not splitting.

The number of splits or a quad-tree split depth may vary according to a slice type. For example, an image may be split into four blocks in an I slice, but not split in a P slice or a B slice.

Figure 6A:
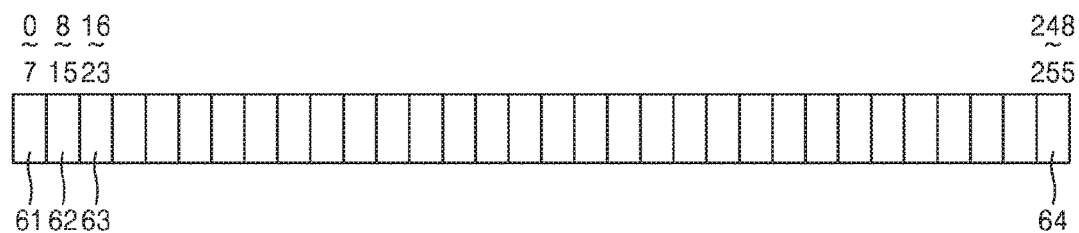
FIG. 6A is a diagram for describing a method of filtering using bands determined by dividing a total range of a sample value into signaled intervals or predetermined intervals, according to an exemplary embodiment.

FIG. 6A is a diagram for describing a method of filtering using bands determined by dividing a total range of a sample value into signaled intervals or predetermined intervals, according to an exemplary embodiment.

The decoder 22 according to an exemplary embodiment may divide a total range of a luma sample value or a total range of a chroma sample value into signaled intervals or predetermined intervals. Also, the decoder 22 may determine a filter parameter set depending on which of divided bands includes a sample value that is a correction target.

For example, the decoder 22 may express a total range of the luma sample value as integers from 0 to 255. Therefore, brightness may be shown as one of 0 to 255.

Also, as shown in FIG. 6A, the decoder 22 divided the luma sample value expressed as integers from 0 to 255 into bands having a width of 8. Therefore, the total range of the luma sample value may include 32 bands. The luma sample value may include 0 to 7 in a first band 61. The luma sample value may include 8 to 15 in a second band 62. The luma sample value may include 16 to 23 in a third band 63. Also, the luma sample value may include 248 to 255 in a $32^{nd}$ band 64.

The decoder 22 may determine the filter parameter set based on which of the 32 bands includes the luma sample value that is a correction target.

For example, the decoder 22 may set such that different filter parameter sets respectively correspond to the 32 bands. A filter parameter set corresponding to a band including the luma sample value that is the correction target may be used to correct the luma sample value.

As another example, the decoder 22 may set such that an identical filter parameter set corresponds to a plurality of bands. As described above, a filter parameter set that corresponds to the luma sample value may be used to correct the luma sample value. However, in this case, an identical filter parameter set may be used to correct the luma sample value even when a different band includes the luma sample value.

Figure 6B:
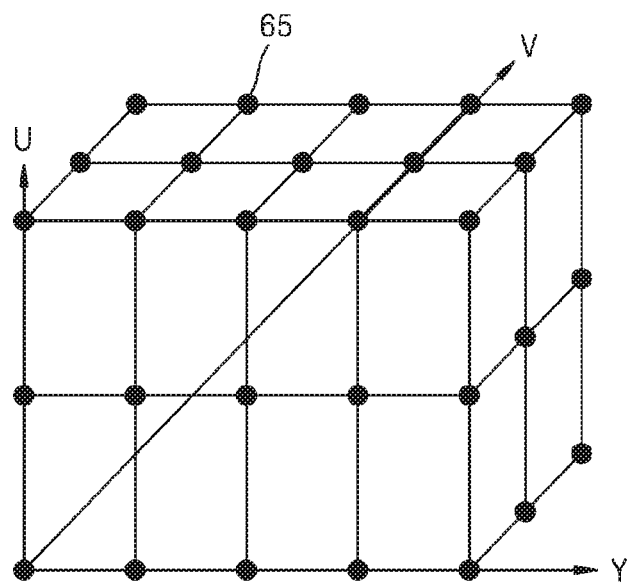
FIG. 6B is a diagram for describing a color space, according to an exemplary embodiment.

FIG. 6B is a diagram for describing a color space, according to an exemplary embodiment.

The color space may be a 2-dimensional (2D) space or a 3-dimensional (3D) space. For convenience, FIG. 6B shows an example in which the color space is a 3D space.

The color space may include a Y-axis of a luma sample, a U-axis of a chroma sample, and a V-axis of another chroma sample. Each of the Y-, U-, and V-axes may be divided into a predetermined number between the maximum value and the minimum value.

For example, when a total range of a luma sample value in an image is 0 to 255 and a width of each of bands is 64, the Y-axis of the luma sample may include four bands. As another example, the U-axis and the V-axis may include two bands, respectively.

FIG. 6B shows an exemplary embodiment in which the Y-axis includes four bands, the U-axis includes two bands, and the V-axis includes two bands. In FIG. 6B, the color space includes 45 vertices. A vertex may indicate a point 65 where peripheries of the bands meet. The vertex may indicate a vertex of a tetrahedron in the space or a vertex of a regular hexahedron in the color space.

'yIdx' may indicate a value corresponding to respective peripheries of the bands in the Y-axis, 'uIdx' may indicate a value corresponding to respective peripheries of the bands in the U-axis, and 'vIdx' may indicate a value corresponding to respective peripheries of the bands in the V-axis. Therefore, the vertex may be determined according to a combination of yIdx, uIdx, and vIdx.

It may be necessary to obtain four nearest vertices when the video decoding apparatus 20 performs filtering. For example, when correcting a value of a sample that is a correction target in the color space, values corresponding to four vertices that are nearest to the sample may be used. A value corresponding to a vertex may indicate coordinates of the vertex in the color space or a sample value at the coordinates of the vertex in the color space.

Figure 6C:
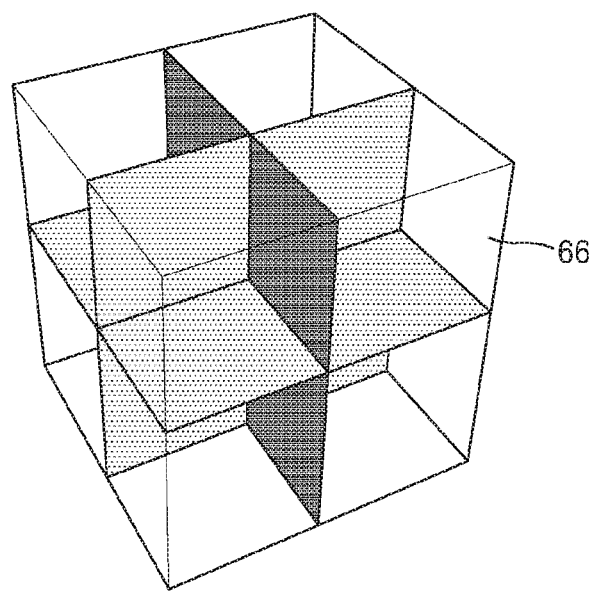
FIG. 6C is a diagram for describing depth in a color space, according to an exemplary embodiment.

FIG. 6C is a diagram for describing depth in a color space, according to an exemplary embodiment.

FIG. 6C shows a 3D color space having a depth value of 1, according to an exemplary embodiment. When a 3D space is split, all three surfaces of the 3D space may be split.

Therefore, when the depth value is 1, the 3D color space may be split into eight spaces. Also, partitions of each of the spaces may be additionally split. For example, the video decoding apparatus 20 may determine whether to additionally split eight partitions 66. Each of the partitions 66 that are split may be split again into eight partitions. According to an exemplary embodiment, a partition may refer to a space formed by splitting.

Figure 7A:
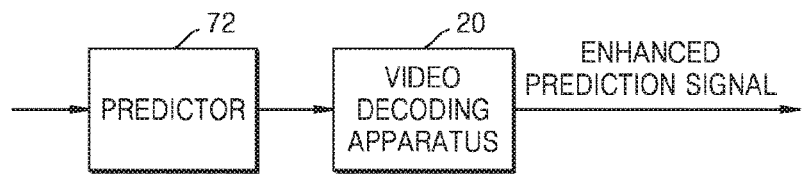
FIG. 7A is a diagram for describing a method of providing an enhanced prediction signal by using a video decoding apparatus when performing inter prediction or intra prediction, according to an exemplary embodiment.

FIG. 7A is a diagram for describing a method of providing an enhanced prediction signal by using the video decoding apparatus 20 when performing inter prediction or intra prediction, according to an exemplary embodiment.

A predictor 72 may perform inter prediction or intra prediction. The video decoding apparatus 20 may correct a value of a sample on which inter prediction and intra prediction has been performed. The correction method has been described above.

The video decoding apparatus 20 may correct a signal received from the predictor 72 and output an enhanced prediction signal.

Figure 7B:
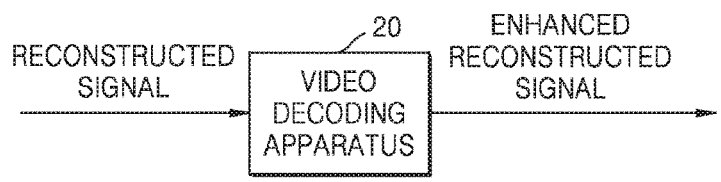
FIG. 7B is a diagram for describing a method of providing an enhanced reconstructed signal by using a video decoding apparatus when performing post-processing, according to an exemplary embodiment.

FIG. 7B is a diagram for describing a method of providing an enhanced reconstructed signal by using the video decoding apparatus 20 when performing post-processing, according to an exemplary embodiment.

The video decoding apparatus 20 may receive a reconstructed signal. The reconstructed signal received by the video decoding apparatus 20 may be a signal of a base layer or a signal of an enhanced layer. Also, the video decoding apparatus 20 may correct the received reconstructed signal according to the above-described method and output an enhanced reconstructed signal.

As shown in FIG. 7B, the video decoding apparatus 20 may be used to perform post-processing. Therefore, an enhanced reconstructed signal may be obtained by correcting a reconstructed image signal, regardless of an encoding method. Accordingly, an image with improved quality may be obtained by adding the video decoding apparatus 20 to an imaging device.

Figure 7C:
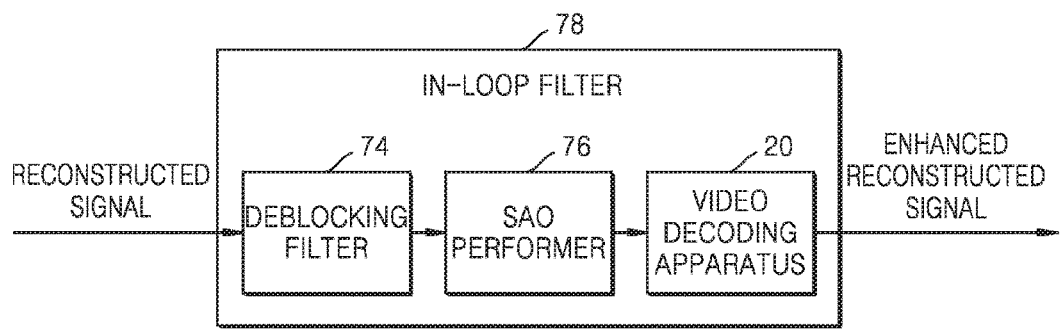
FIG. 7C is a diagram for describing a method of providing an enhanced reconstructed signal by using a video decoding apparatus when performing filtering using an in-loop filter, according to an exemplary embodiment.

FIG. 7C is a diagram for describing a method of providing an enhanced reconstructed signal by using the video decoding apparatus 20 when performing filtering using an in-loop filter 78, according to an exemplary embodiment;

The video decoding apparatus 20 may be included in the in-loop filter 78. Therefore, the in-loop filter 78 may perform a filtering operation that is different from filtering operations performed by a deblocking filter 74 or an SAO performer 76. When the video decoding apparatus 20 according to an exemplary embodiment is included in the in-loop filter 78, an encoder and a decoder may perform an identical filtering operation.

Also, when the video decoding apparatus 20 is included in the in-loop filter 78, the video decoding apparatus 20 may perform some of the filtering operations performed by the deblocking filter 74 or the SAO performer 76.

Although FIGS. 2A to 7 show various exemplary embodiments of the video decoding apparatus 20 correcting a sample value, one of ordinary skill in the art would be able to understand that the methods described with reference to FIGS. 2A to 7 may also be performed by the video encoding apparatus 10.

Figure 8:
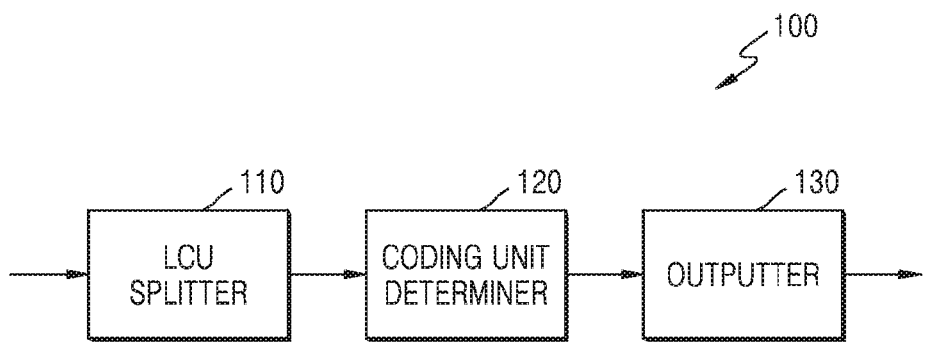
FIG. 8 is a block diagram of a video encoding apparatus based on coding units according to a tree structure, according to an embodiment.

FIG. 8 is a block diagram of a video encoding apparatus 100 based on coding units according to a tree structure, according to one or more embodiments.

The video encoding apparatus 100 involving video prediction based on coding units according to a tree structure includes a coding unit determiner 120, and an outputter 130.

The coding unit determiner 120 may split a current picture based on a LCU that is a coding unit having a maximum size for a current picture of an image. If the current picture is larger than the LCU, image data of the current picture may be split into the at least one LCU. The LCU according to one or more exemplary embodiments may be a data unit having a size of 32×32, 64×64, 128×128, 256×256, etc., wherein a shape of the data unit is a square having a width and length in squares of 2.

A coding unit according to one or more embodiments may be characterized by a maximum size and a depth. The depth denotes the number of times the coding unit is spatially split from the LCU, and as the depth deepens, deeper coding units according to depths may be split from the LCU to a smallest coding unit (SCU). A depth of the LCU is an uppermost depth and a depth of the SCU is a lowermost depth. Since a size of a coding unit corresponding to each depth decreases as the depth of the LCU deepens, a coding unit corresponding to an upper depth may include a plurality of coding units corresponding to lower depths.

As described above, the image data of the current picture is split into the LCUs according to a maximum size of the coding unit, and each of the LCUs may include deeper coding units that are split according to depths. Since the LCU according to one or more embodiments is split according to depths, the image data of the space domain included in the LCU may be hierarchically classified according to depths.

A maximum depth and a maximum size of a coding unit, which limit the total number of times a height and a width of the LCU are hierarchically split, may be predetermined.

The coding unit determiner 120 encodes at least one split region obtained by splitting a region of the LCU according to depths, and determines a depth to output a finally encoded image data according to the at least one split region. In other words, the coding unit determiner 120 determines a depth by encoding the image data in the deeper coding units according to depths, according to the LCU of the current picture, and selecting a depth having the least encoding error. The determined depth and the encoded image data according to the determined depth are output to the outputter 130.

The image data in the LCU is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one depth may be selected for each LCU.

The size of the LCU is split as a coding unit is hierarchically split according to depths, and as the number of coding units increases. Also, even if coding units correspond to the same depth in one LCU, it is determined whether to split each of the coding units corresponding to the same depth to a lower depth by measuring an encoding error of the image data of the each coding unit, separately. Accordingly, even when image data is included in one LCU, the encoding errors may differ according to regions in the one LCU, and thus the depths may differ according to regions in the image data. Thus, one or more depths may be determined in one LCU, and the image data of the LCU may be divided according to coding units of at least one depth.

Accordingly, the coding unit determiner 120 may determine coding units having a tree structure included in the LCU. The 'coding units having a tree structure' according to one or more embodiments include coding units corresponding to a depth determined to be the depth, from among all deeper coding units included in the LCU. A coding unit of a depth may be hierarchically determined according to depths in the same region of the LCU, and may be independently determined in different regions. Similarly, a depth in a current region may be independently determined from a depth in another region.

A maximum depth according to one or more embodiments is an index related to the number of splitting times from a LCU to an SCU. A first maximum depth according to one or more embodiments may denote the total number of splitting times from the LCU to the SCU. A second maximum depth according to one or more embodiments may denote the total number of depth levels from the LCU to the SCU. For example, when a depth of the LCU is 0, a depth of a coding unit, in which the LCU is split once, may be set to 1, and a depth of a coding unit, in which the LCU is split twice, may be set to 2. Here, if the SCU is a coding unit in which the LCU is split four times, 5 depth levels of depths 0, 1, 2, 3, and 4 exist, and thus the first maximum depth may be set to 4, and the second maximum depth may be set to 5.

Prediction encoding and transformation may be performed according to the LCU. The prediction encoding and the transformation are also performed based on the deeper coding units according to a depth equal to or depths less than the maximum depth, according to the LCU.

Since the number of deeper coding units increases whenever the LCU is split according to depths, encoding, including the prediction encoding and the transformation, is performed on all of the deeper coding units generated as the depth deepens. For convenience of description, the prediction encoding and the transformation will now be described based on a coding unit of a current depth, in a LCU.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the LCU, the prediction encoding may be performed based on a coding unit corresponding to a depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the data unit for the transformation may include a data unit for an intra mode and a data unit for an inter mode.

The transformation unit in the coding unit may be recursively split into smaller sized regions in the similar manner as the coding unit according to the tree structure. Thus, residual image data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a depth requires not only information about the depth, but also about information related to prediction encoding and transformation. Accordingly, the coding unit determiner 120 not only determines a depth having a least encoding error, but also determines a partition mode in a prediction unit, a prediction mode according to prediction units, and a size of a transformation unit for transformation.

Coding units according to a tree structure in a LCU and methods of determining a prediction unit/partition, and a transformation unit, according to one or more embodiments, will be described in detail below with reference to FIGS. 7 through 19.

The coding unit determiner 120 may measure an encoding error of deeper coding units according to depths by using Rate-Distortion Optimization based on Lagrangian multipliers.

The outputter 130 outputs the image data of the LCU, which is encoded based on the at least one depth determined by the coding unit determiner 120, and information about the encoding mode according to the depth, in bitstreams.

The encoded image data may be obtained by encoding residual image data of an image.

The information about the encoding mode according to depth may include information about the depth, about the partition mode in the prediction unit, the prediction mode, and the size of the transformation unit.

The information about the depth may be defined by using splitting information according to depths, which indicates whether encoding is performed on coding units of a lower depth instead of a current depth. If the current depth of the current coding unit is the depth, image data in the current coding unit is encoded and output, and thus the splitting information may be defined not to split the current coding unit to a lower depth. Alternatively, if the current depth of the current coding unit is not the depth, the encoding is performed on the coding unit of the lower depth, and thus the splitting information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one LCU, and information about at least one encoding mode is determined for a coding unit of a depth, information about at least one encoding mode may be determined for one LCU. Also, a depth of the image data of the LCU may be different according to locations since the image data is hierarchically split according to depths, and thus splitting information may be set for the image data.

Accordingly, the outputter 130 may assign corresponding splitting information to at least one selected from the coding unit, the prediction unit, and a minimum unit included in the LCU.

The minimum unit according to one or more embodiments is a square data unit obtained by splitting the SCU constituting the lowermost depth by 4. Alternatively, the minimum unit according to an embodiment may be a maximum square data unit that may be included in all of the coding units, prediction units, partition units, and transformation units included in the LCU.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The outputter 130 may encode and output SAO parameters related to the SAO operation described above with reference to FIGS. 1A through 14.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each LCU, based on the size of the LCU and the maximum depth determined considering characteristics of the current picture. Also, since encoding may be performed on each LCU by using any one of various prediction modes and transformations, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

The video encoding apparatus 10 described with reference to FIG. 1A may include as many video encoding apparatuses 100 as the number of layers in order to encode single-layer images for respective layers of a multi-layer video. When the video encoding apparatus 100 encodes first layer images, the coding determiner 120 may determine a prediction unit for inter prediction for each respective coding unit according to a tree structure for each largest coding unit and may perform inter prediction for each respective prediction unit.

When the video encoding apparatus 100 encodes second layer images, the coding determiner 120 may also determine a prediction unit and a coding unit according to a tree structure for each largest coding unit and may perform inter prediction for each respective prediction unit.

The video encoding apparatus 100 may encode a brightness difference between first and second layer images for compensating for the brightness difference. However, whether to perform brightness compensation may be determined according to an encoding mode of a coding unit. For example, the brightness compensation may be performed only on a prediction unit of 2N×2N.

Figure 9:
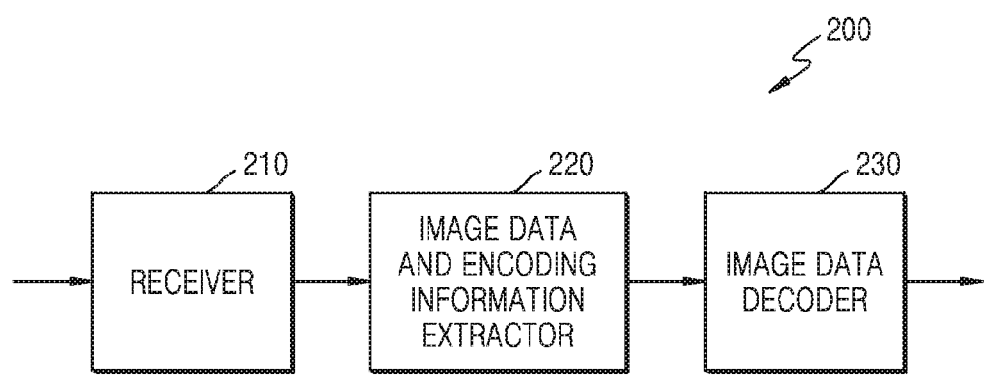
FIG. 9 is a block diagram of a video decoding apparatus based on coding units according to a tree structure, according to an embodiment.

FIG. 9 is a block diagram of a video decoding apparatus 200 based on coding units having a tree structure, according to one or more embodiments.

The video decoding apparatus 200 that involves video prediction based on coding units having a tree structure includes a receiver 210, an image data and encoding information extractor 220, and an image data decoder 230.

Definitions of various terms, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each LCU, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts splitting information and encoding information for the coding units having a tree structure according to each LCU, from the parsed bitstream. The extracted splitting information and encoding information are output to the image data decoder 230. In other words, the image data in a bit stream is split into the LCU so that the image data decoder 230 decodes the image data for each LCU.

The splitting information and encoding information according to the LCU may be set for at least one piece of splitting information corresponding to the depth, and encoding information according to the depth may include information about a partition mode of a corresponding coding unit corresponding to the depth, information about a prediction mode, and splitting information of a transformation unit. Also, splitting information according to depths may be extracted as the information about a final depth.

The splitting information and the encoding information according to each LCU extracted by the image data and encoding information extractor 220 is splitting information and encoding information determined to generate a minimum encoding error when an encoder, such as the video encoding apparatus 100, repeatedly performs encoding for each deeper coding unit according to depths according to each LCU. Accordingly, the video decoding apparatus 200 may reconstruct an image by decoding the image data according to a depth and an encoding mode that generates the minimum encoding error.

Since the splitting information and the encoding information may be assigned to a predetermined data unit from among a corresponding coding unit, a prediction unit, and a minimum unit, the image data and encoding information extractor 220 may extract the splitting information and the encoding information according to the predetermined data units. If splitting information and encoding information of a corresponding LCU are recorded according to predetermined data units, the predetermined data units to which the same splitting information and encoding information are assigned may be inferred to be the data units included in the same LCU.

The image data decoder 230 reconstructs the current picture by decoding the image data in each LCU based on the splitting information and the encoding information according to the LCUs. In other words, the image data decoder 230 may decode the encoded image data based on the extracted information about the partition mode, the prediction mode, and the transformation unit for each coding unit from among the coding units having the tree structure included in each LCU. A decoding process may include a prediction including intra prediction and motion compensation, and an inverse transformation.

The image data decoder 230 may perform intra prediction or motion compensation according to a partition and a prediction mode of each coding unit, based on the information about the partition mode and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each LCU. Via the inverse transformation, a pixel value of the space domain of the coding unit may be reconstructed.

The image data decoder 230 may determine a final depth of a current LCU by using splitting information according to depths. If the splitting information indicates that image data is no longer split in the current depth, the current depth is the final depth. Accordingly, the image data decoder 230 may decode encoded data in the current LCU by using the information about the partition mode of the prediction unit, the information about the prediction mode, and the splitting information of the transformation unit for each coding unit corresponding to the depth.

In other words, data units containing the encoding information including the same splitting information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The video decoding apparatus 20 described with reference to FIG. 2A may include as many video decoding apparatuses 200 as the number of views in order to decode the received first layer image stream and second layer image stream to restore first layer images and second layer images.

When a first layer image stream is received, the image data decoder 230 of the video decoding apparatus 200 may split samples of first layer images that are extracted from the first layer image stream by the extractor 220 into coding units according to a tree structure of a largest coding unit. The image data decoder 230 may perform motion compensation on respective prediction units for inter prediction for each respective coding unit according to a tree structure of the samples of the first layer images, to restore the first layer images.

When a second layer image stream is received, the image data decoder 230 of the video decoding apparatus 200 may split samples of second layer images that are extracted from the second layer image stream by the extractor 220 into coding units according to a tree structure of a largest coding unit. The image data decoder 230 may perform motion compensation on respective prediction units for inter prediction of the samples of the second layer images to restore the second layer images.

The extractor 220 may obtain information relating to a brightness order between first and second layer images from a bitstream in order to compensate for the brightness difference. However, whether to perform brightness compensation may be determined according to an encoding mode of a coding unit. For example, the brightness compensation may be performed only on a prediction unit of 2N×2N.

The video decoding apparatus 200 may obtain information about at least one coding unit that generates the minimum encoding error when encoding is recursively performed for each largest coding unit, and may use the information to decode the current picture. In other words, the coding units having the tree structure determined to be the optimum coding units in each largest coding unit may be decoded. Also, the maximum size of a coding unit is determined considering a resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

Figure 10:
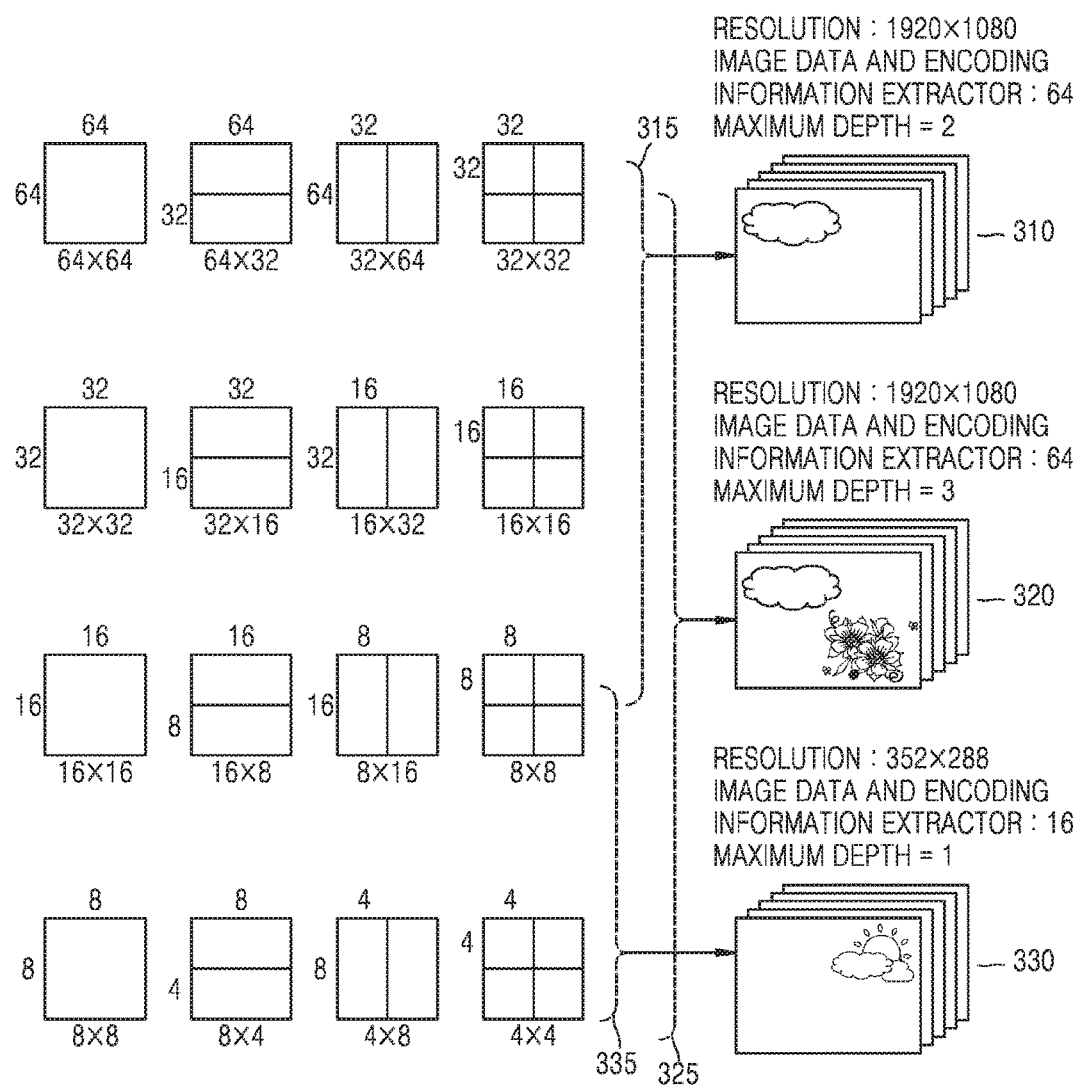
FIG. 10 is a diagram for describing a concept of coding units according to an embodiment.

FIG. 10 is a diagram for describing a concept of coding units according to various embodiments.

A size of a coding unit may be expressed by width x height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 17 denotes a total number of splits from a LCU to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a LCU having a long axis size of 64, and coding units having long axis sizes of 32 and 16 since depths are deepened to two layers by splitting the LCU twice. Since the maximum depth of the video data 330 is 1, coding units 335 of the video data 330 may include a LCU having a long axis size of 16, and coding units having a long axis size of 8 since depths are deepened to one layer by splitting the LCU once.

Since the maximum depth of the video data 320 is 3, coding units 325 of the video data 320 may include a LCU having a long axis size of 64, and coding units having long axis sizes of 32, 16, and 8 since the depths are deepened to 3 layers by splitting the LCU three times. As a depth deepens, detailed information may be precisely expressed.

Figure 11:
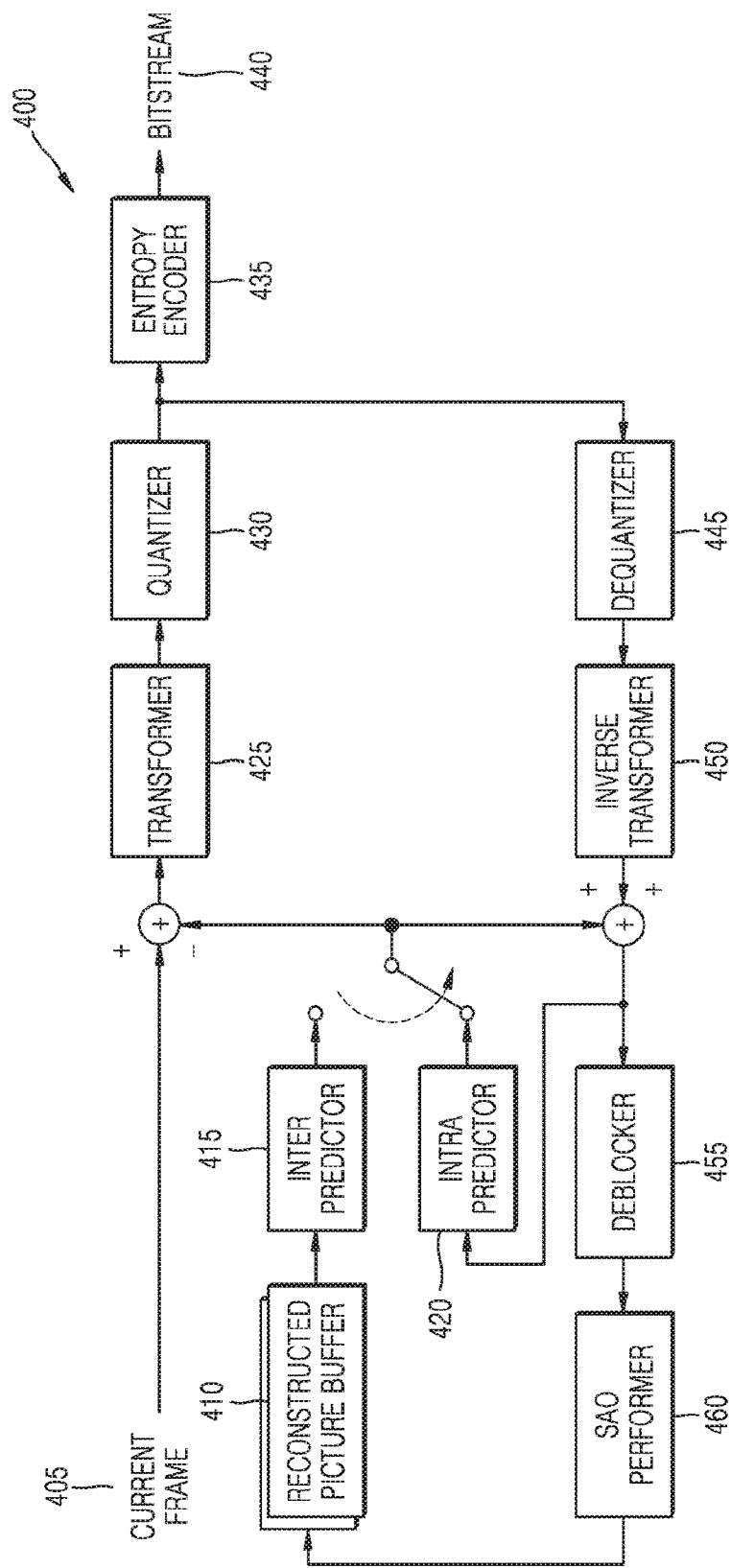
FIG. 11 is a block diagram of an image encoder based on coding units, according to an embodiment.

FIG. 11 is a block diagram of an image encoder 400 based on coding units, according to one or more embodiments.

The image encoder 400 performs operations necessary for encoding image data in the coding unit determiner 120 of the video encoding apparatus 100. In other words, an intra predictor 420 performs intra prediction on coding units in an intra mode according to prediction units, from among a current frame 405, and an inter predictor 415 performs inter prediction on coding units in an inter mode by using a current image 405 and a reference image obtained from a reconstructed picture buffer 410 according to prediction units. The current image 405 may be split into LCUs and then the LCUs may be sequentially encoded. In this regard, the LCUs that are to be split into coding units having a tree structure may be encoded.

Residual image data is generated by removing prediction data regarding coding units of each mode that is output from the intra predictor 420 or the inter predictor 415 from data regarding encoded coding units of the current image 405, and is output as a quantized transformation coefficient according to transformation units through a transformer 425 and a quantizer 430. The quantized transformation coefficient is reconstructed as the residual image data in a space domain through a dequantizer 445 and an inverse transformer 450. The reconstructed residual image data in the space domain is added to prediction data for coding units of each mode that is output from the intra predictor 420 or the inter predictor and thus is reconstructed as data in a space domain for coding units of the current image 405. The reconstructed data in the space domain is generated as reconstructed images through a de-blocker 455 and an SAO performer 460 and the reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the dequantizer 445, the inverse transformer 450, the de-blocker 455, and the SAO performer 460, perform operations based on each coding unit among coding units having a tree structure according to each LCU.

In particular, the intra predictor 410, the motion estimator 420, and the motion compensator 425 determines partitions and a prediction mode of each coding unit from among the coding units having a tree structure while considering the maximum size and the maximum depth of a current LCU, and the transformer 430 determines the size of the transformation unit in each coding unit from among the coding units having a tree structure.

Specifically, the intra predictor 420 and the inter predictor 415 may determine a partition mode and a prediction mode of each coding unit among the coding units having a tree structure in consideration of a maximum size and a maximum depth of a current LCU, and the transformer 425 may determine whether to split a transformation unit having a quad tree structure in each coding unit among the coding units having a tree structure.

Figure 12:
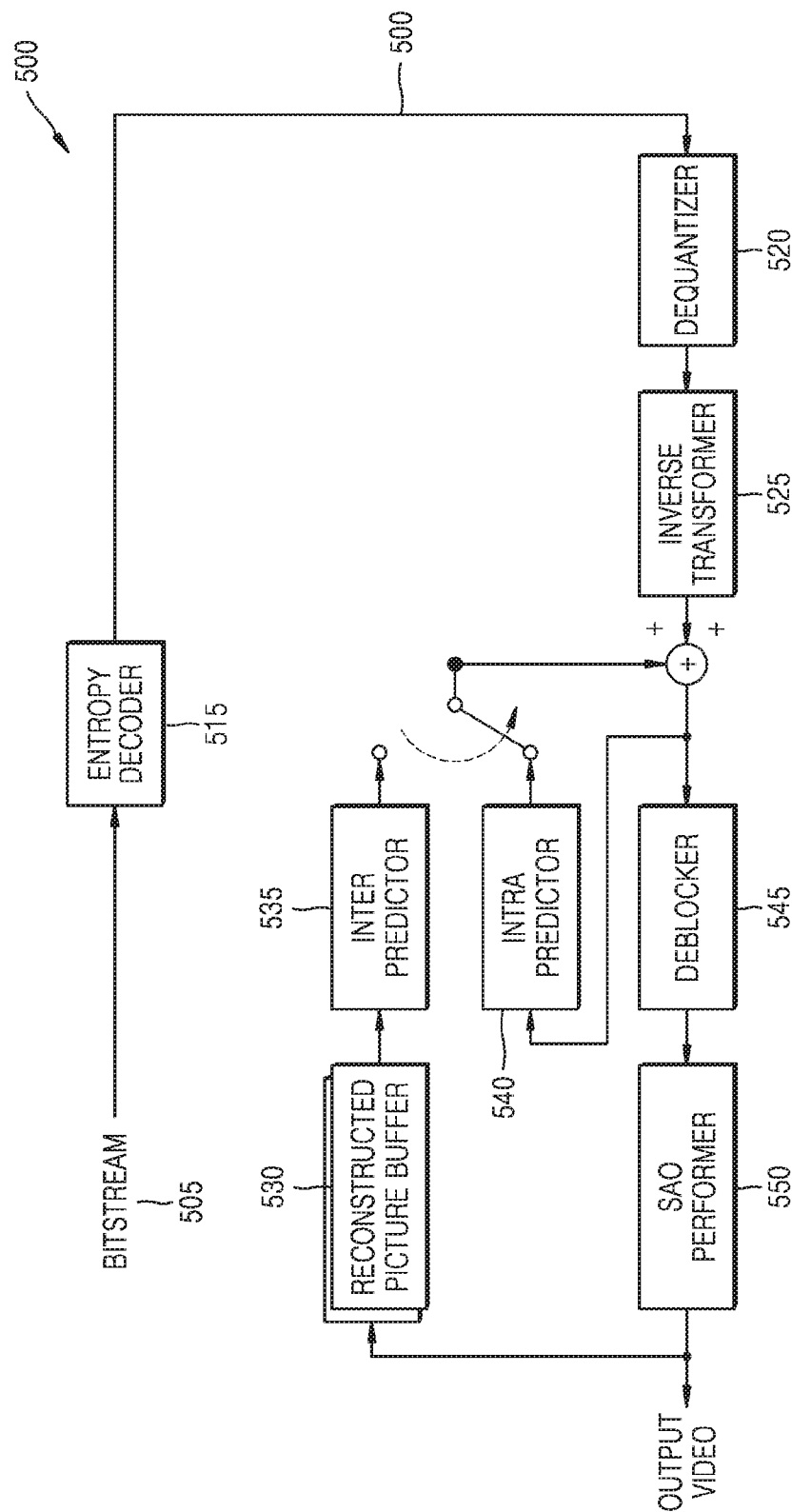
FIG. 12 is a block diagram of an image decoder based on coding units, according to an embodiment.

FIG. 12 is a block diagram of an image decoder 500 based on coding units, according to one or more embodiments.

An entropy decoder 515 parses encoded image data to be decoded and information about encoding required for decoding from a bitstream 505. The encoded image data is a quantized transformation coefficient from which residual image data is reconstructed by a dequantizer 520 and an inverse transformer 525.

An intra predictor 540 performs intra prediction on coding units in an intra mode according to each prediction unit. An inter predictor 535 performs inter prediction on coding units in an inter mode from among the current image 405 for each prediction unit by using a reference image obtained from a reconstructed picture buffer 530.

Prediction data and residual image data regarding coding units of each mode, which passed through the intra predictor 540 and the inter predictor 535, are summed, and thus data in a space domain regarding coding units of the current image 405 may be reconstructed, and the reconstructed data in the space domain may be output as a reconstructed image 560 through a de-blocker 545 and an SAO performer 550. Reconstructed images stored in the reconstructed picture buffer 530 may be output as reference images.

In order to decode the image data in the image data decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the dequantizer 520, the inverse transformer 525, the inter predictor 535, the de-blocker 545, and the SAO performer 550 may perform operations based on coding units having a tree structure for each LCU.

In particular, the SAO performer 550 and the inter predictor 535 may determine a partition and a prediction mode for each of the coding units having a tree structure, and the inverse transformer 525 may determine whether to split a transformation unit having a quad tree structure for each of the coding units.

Figure 13:
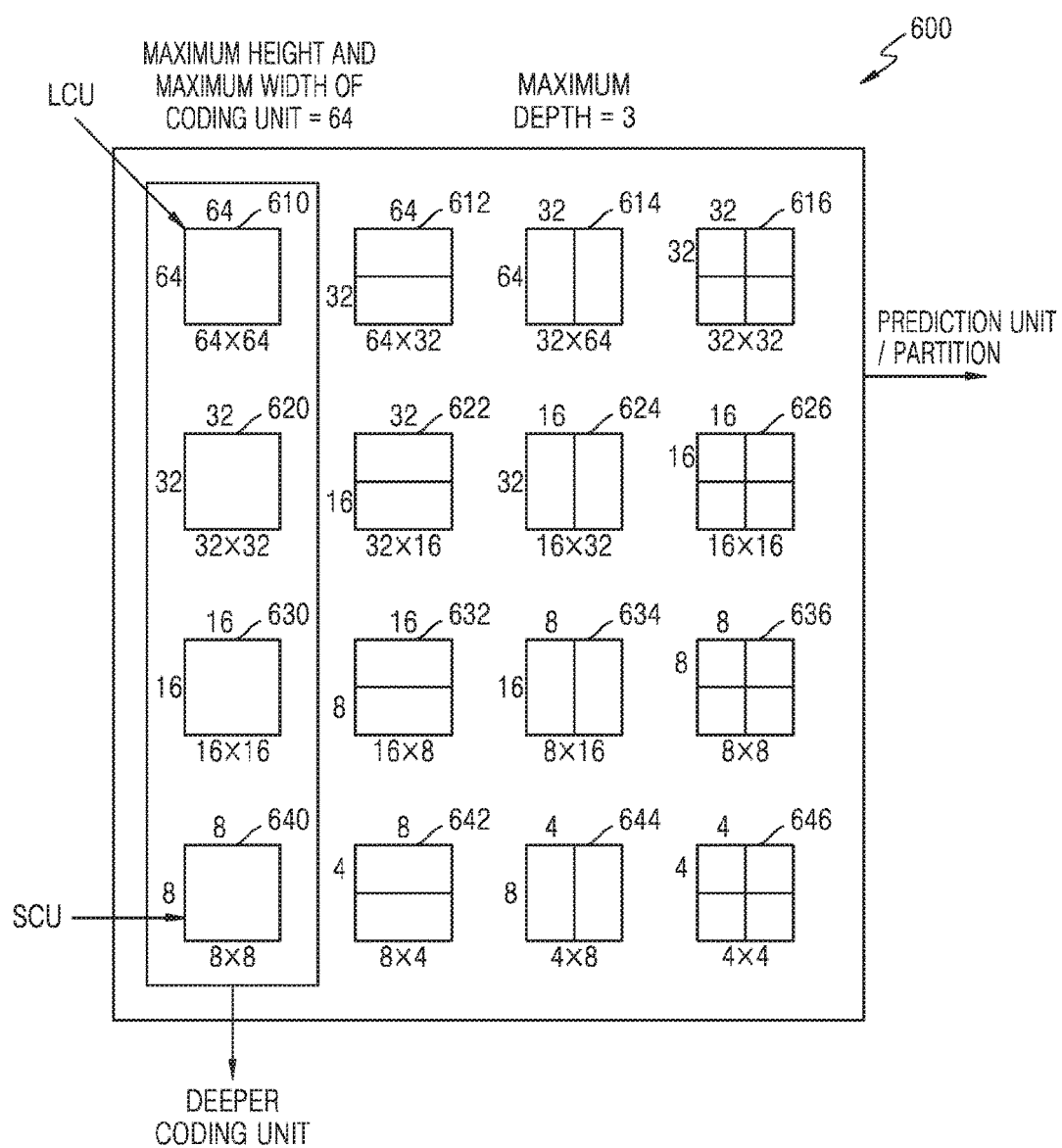
FIG. 13 is a diagram illustrating deeper coding units and partitions, according to an embodiment.

The encoding operation of FIG. 10 and the encoding operation of FIG. 11 describe video stream encoding and decoding operations in a single layer, respectively. Thus, if the encoder 12 of FIG. 1A encodes video streams of two or more layers, the image encoder 400 may be provided for each layer. Similarly, if the decoder 22 of FIG. 2A decodes video streams of two or more layers, the image decoder 500 may be provided for each layer FIG. 13 is a diagram illustrating deeper coding units according to depths, and partitions, according to one or more embodiments.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to one or more embodiments, the maximum height and the maximum width of the coding units are each 64, and the maximum depth is 3. In this case, the maximum depth refers to a total number of times the coding unit is split from the LCU to the SCU. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a LCU in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is an SCU.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine a final depth of the coding units constituting the LCU 610, the coding unit determiner 120 of the video encoding apparatus 100 performs encoding for coding units corresponding to each depth included in the LCU 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the final depth and a partition mode of the coding unit 610.

Figure 14:
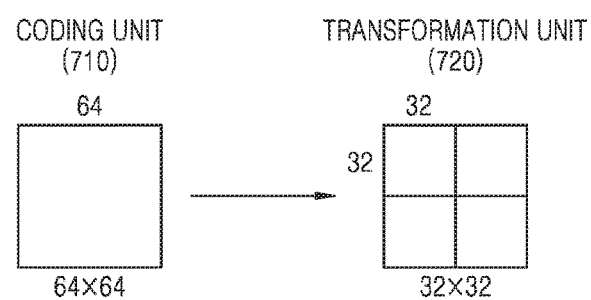
FIG. 14 is a diagram for describing a relationship between a coding unit and transformation units, according to an embodiment.

FIG. 14 is a diagram for describing a relationship between a coding unit 710 and transformation units 720, according to one or more embodiments.

The video encoding apparatus 100 or the video decoding apparatus 200 encodes or decodes an image according to coding units having sizes smaller than or equal to a LCU for each LCU. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 15 is a diagram for describing encoding information of coding units corresponding to a depth, according to one or more embodiments.

The outputter 130 of the video encoding apparatus 100 may encode and transmit information 800 about a partition mode, information 810 about a prediction mode, and information 820 about a size of a transformation unit for each coding unit corresponding to a final depth, as information about an encoding mode.

The information 800 indicates information about a mode of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition mode is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the video decoding apparatus 200 may extract and use the information 800, 810, and 820 for decoding, according to each deeper coding unit.

Figure 16:
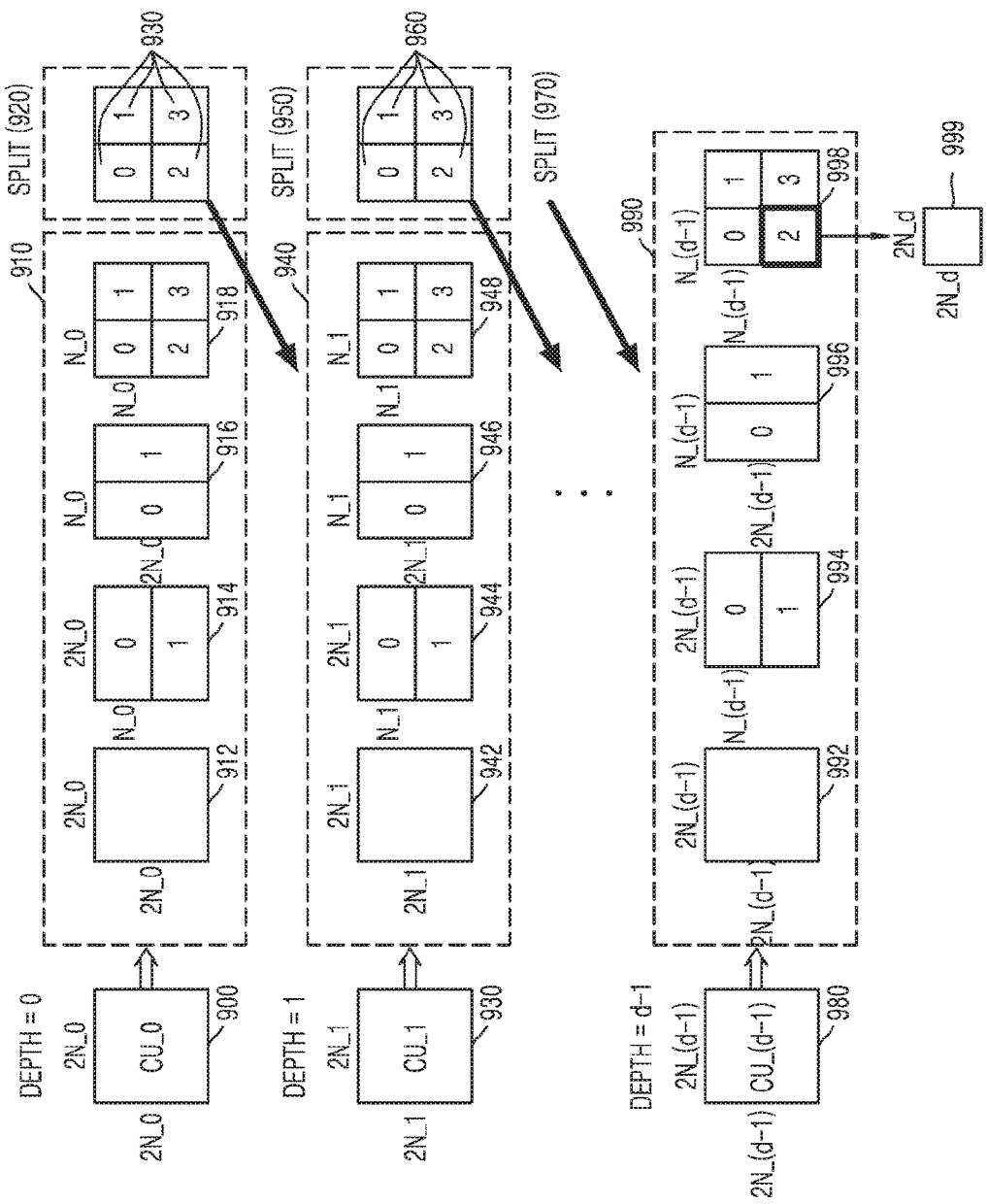
FIG. 16 is a diagram of deeper coding units, according to an embodiment.

FIG. 16 is a diagram of deeper coding units according to depths, according to one or more embodiments.

Splitting information may be used to indicate a change of a depth. The spilt information indicates whether a coding unit of a current depth is split into coding units of a lower depth.

Figure 23:
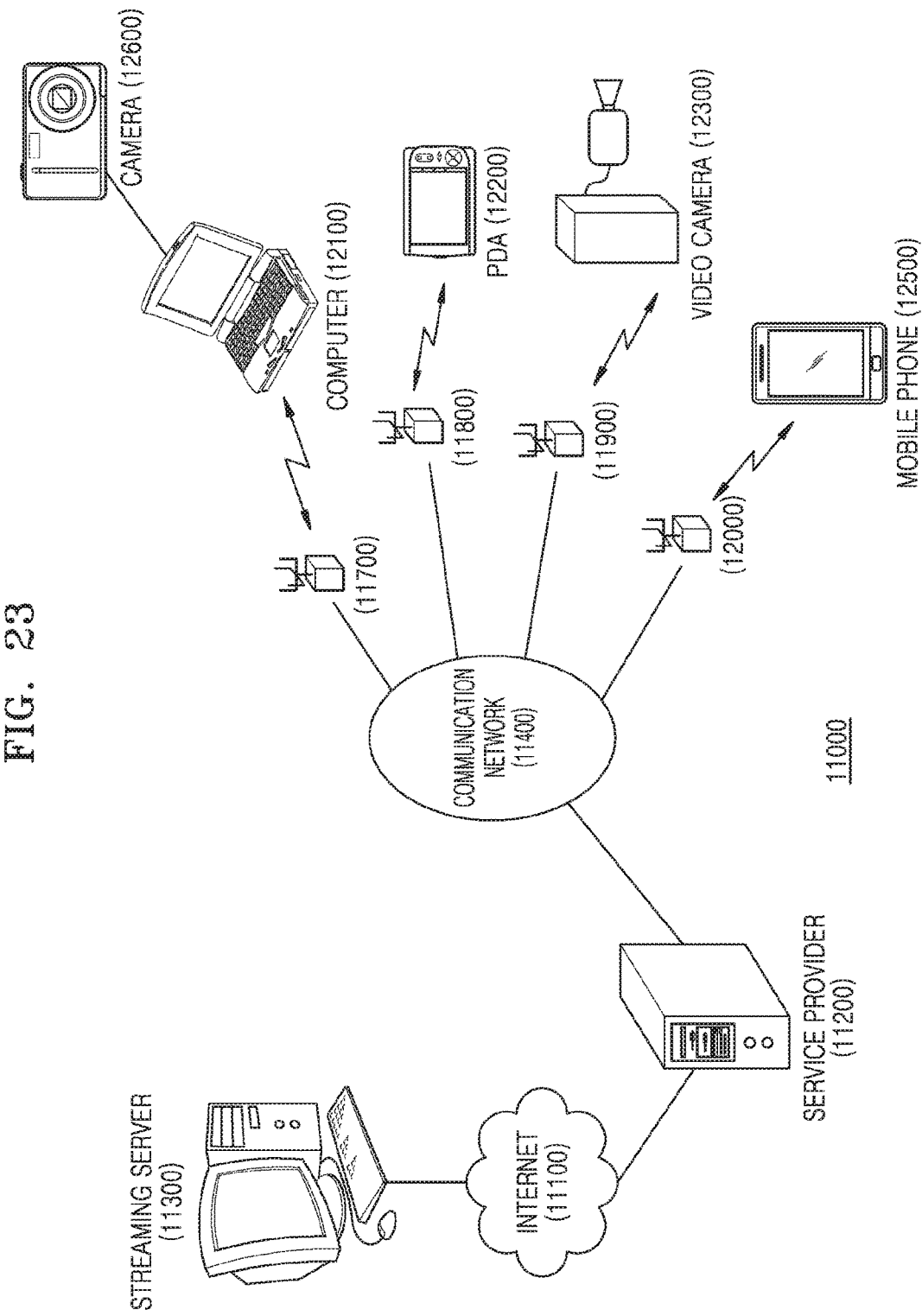
FIG. 23 is a diagram of an overall structure of a content supply system for providing a content distribution service.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0×N_0, a partition mode 916 having a size of N_0×2N_0, and a partition mode 918 having a size of N_0×N_0. FIG. 23 only illustrates the partition modes 912 through 918 which are obtained by symmetrically splitting the prediction unit 910, but a partition mode is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition mode. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912 through 916, the prediction unit 910 may not be split into a lower depth.

If the encoding error is the smallest in the partition mode 918, a depth is changed from 0 to 1 to split the partition mode 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition mode 942 having a size of 2N_1>2N_1, a partition mode 944 having a size of 2N_1>N_1, a partition mode 946 having a size of N_1×2N_1, and a partition mode 948 having a size of N_1×N_1.

If an encoding error is the smallest in the partition mode 948, a depth is changed from 1 to 2 to split the partition mode 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and splitting information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes 992 through 998 to search for a partition mode having a minimum encoding error.

Even when the partition mode 998 has the minimum encoding error, since a maximum depth is d, a coding unit CU_(d−1) having a depth of d−1 is no longer split to a lower depth, and a depth for the coding units constituting a current LCU 900 is determined to be d−1 and a partition mode of the current LCU 900 may be determined to be N_(d−1)×N_(d−1). Also, since the maximum depth is d and an SCU 980 having a lowermost depth of d−1 is no longer split to a lower depth, splitting information for the SCU 980 is not set.

A data unit 999 may be a 'minimum unit' for the current LCU. A minimum unit according to one or more embodiments may be a square data unit obtained by splitting an SCU 980 by 4. By performing the encoding repeatedly, the video encoding apparatus 100 may select a depth having the least encoding error by comparing encoding errors according to depths of the coding unit 900 to determine a depth, and set a corresponding partition mode and a prediction mode as an encoding mode of the depth.

As such, the minimum encoding errors according to depths are compared in all of the depths of 1 through d, and a depth having the least encoding error may be determined as a depth. The depth, the partition mode of the prediction unit, and the prediction mode may be encoded and transmitted as information about an encoding mode. Also, since a coding unit is split from a depth of 0 to a depth, only splitting information of the depth is set to 0, and splitting information of depths excluding the depth is set to 1.

The image data and encoding information extractor 220 of the video decoding apparatus 200 may extract and use the information about the depth and the prediction unit of the coding unit 900 to decode the partition 912. The video decoding apparatus 200 may determine a depth, in which splitting information is 0, as a depth by using splitting information according to depths, and use information about an encoding mode of the corresponding depth for decoding.

Figure 17:
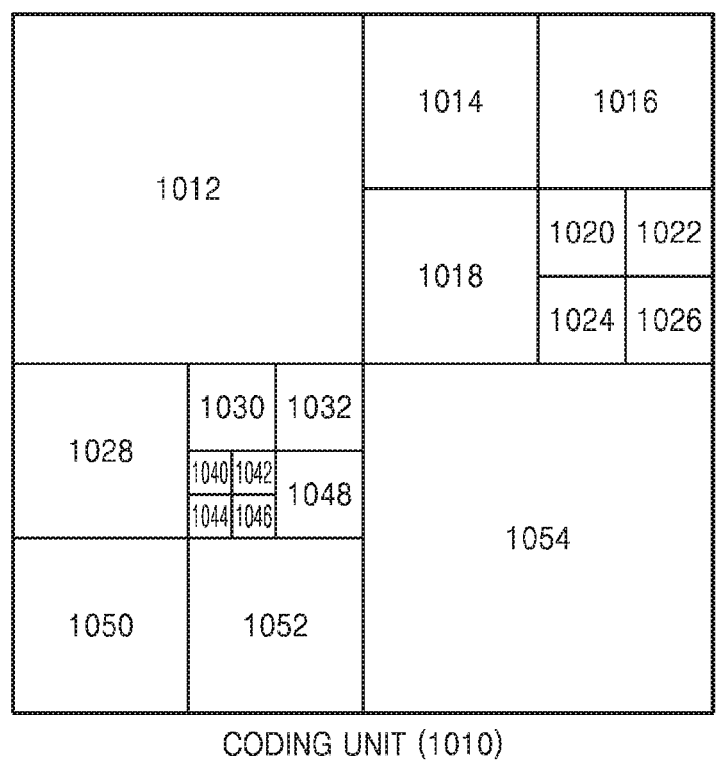
FIGS. 17 through 19 are diagrams for describing a relationship between coding units, prediction units, and transformation units, according to an embodiment.
Figure 18:
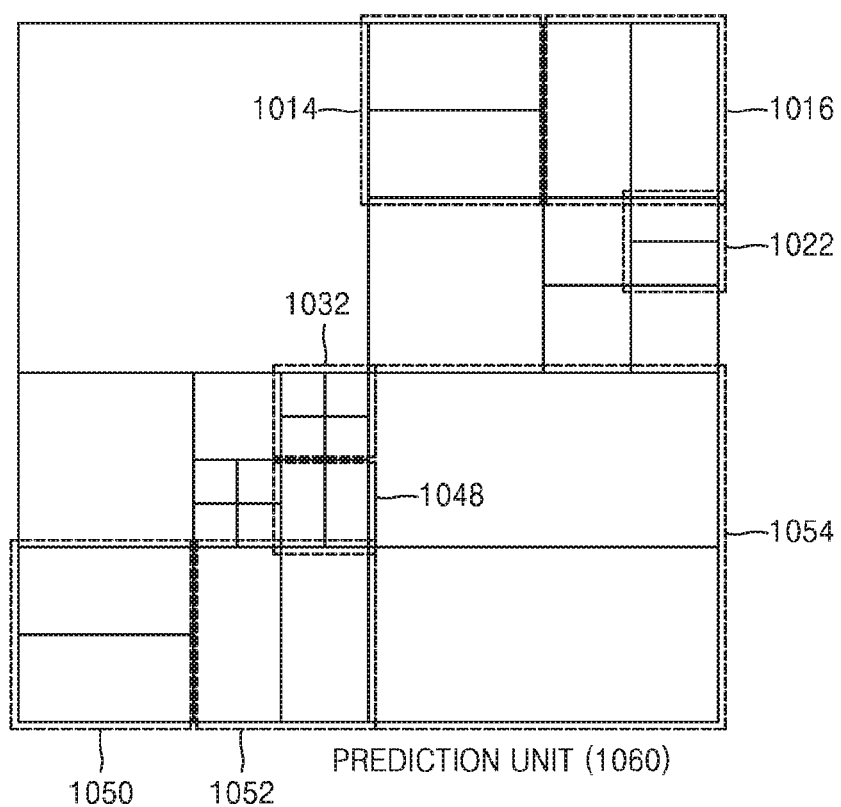
Figure 19:
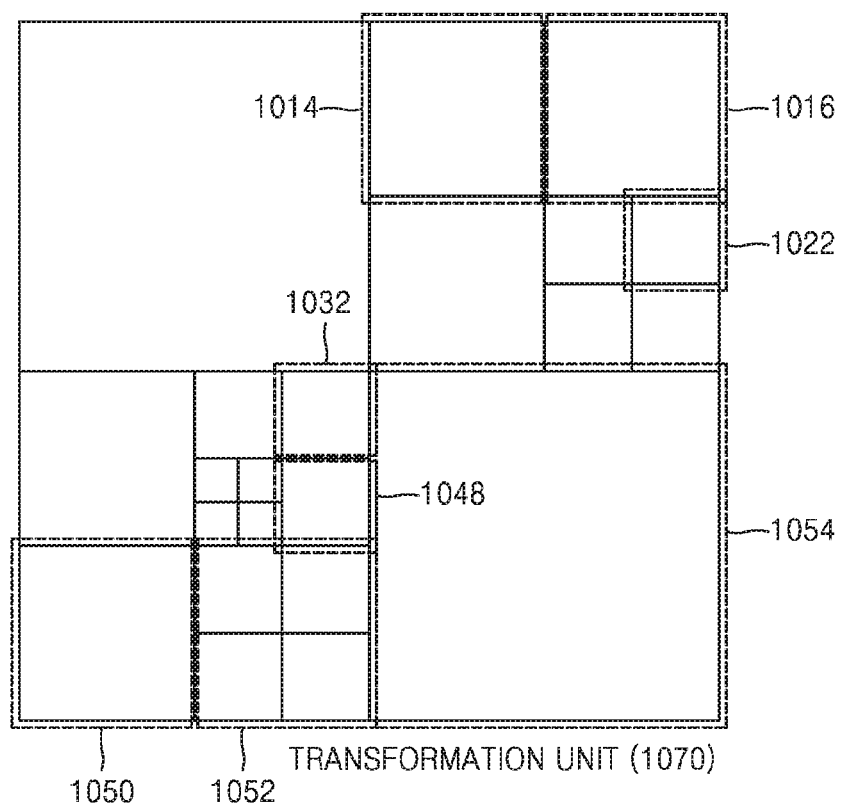

FIGS. 17 through 19 are diagrams for describing a relationship between coding units 1010, prediction units 1060, and transformation units 1070, according to one or more embodiments.

The coding units 1010 are coding units having a tree structure, corresponding to depths determined by the video encoding apparatus 100, in a LCU. The prediction units 1060 are partitions of prediction units of each of the coding units 1010, and the transformation units 1070 are transformation units of each of the coding units 1010.

When a depth of a LCU is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are obtained by splitting the coding units in the coding units 1010. In other words, partition modes in the coding units 1014, 1022, 1050, and 1054 have a size of 2N×N, partition modes in the coding units 1016, 1048, and 1052 have a size of N×2N, and a partition mode of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a LCU to determine an optimum coding unit, and thus coding units having a recursive tree structure may be obtained. Encoding information may include splitting information about a coding unit, information about a partition mode, information about a prediction mode, and information about a size of a transformation unit. Table 1 shows the encoding information that may be set by the video encoding and decoding apparatuses 100 and 200.

The information about the partition mode may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1

The size of the transformation unit may be set to be two types in the intra mode and two types in the inter mode. In other words, if splitting information of the transformation unit is 0, the size of the transformation unit may be 2N×2N, which is the size of the current coding unit. If splitting information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

TABLE 1

Splitting information 0
(Encoding on Coding Unit having Size of 2N × 2N and Current Depth of d)

| | | | Size of Transformation Unit | | |
|---|---|---|---|---|---|
| Prediction Mode | Symmetrical Partition mode | Asymmetrical Partition mode | Splitting information 0 of Transformation Unit | Splitting information 1 of Transformation Unit | Splitting information 1 |
| Intra Inter Skip (Only 2N × 2N) | 2N × 2N 2N × N N × 2N N × N | 2N × nU 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The outputter 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Splitting information indicates whether a current coding unit is split into coding units of a lower depth. If splitting information of a current depth d is 0, a depth, in which a current coding unit is no longer split into a lower depth, is a final depth, and thus information about a partition mode, prediction mode, and a size of a transformation unit may be defined for the final depth. If the current coding unit is further split according to the splitting information, encoding is independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The encoding information about coding units having a tree structure may include at least one selected from a coding unit corresponding to a depth, a prediction unit, and a minimum unit. The coding unit corresponding to the depth may include at least one selected from a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a LCU may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 20:
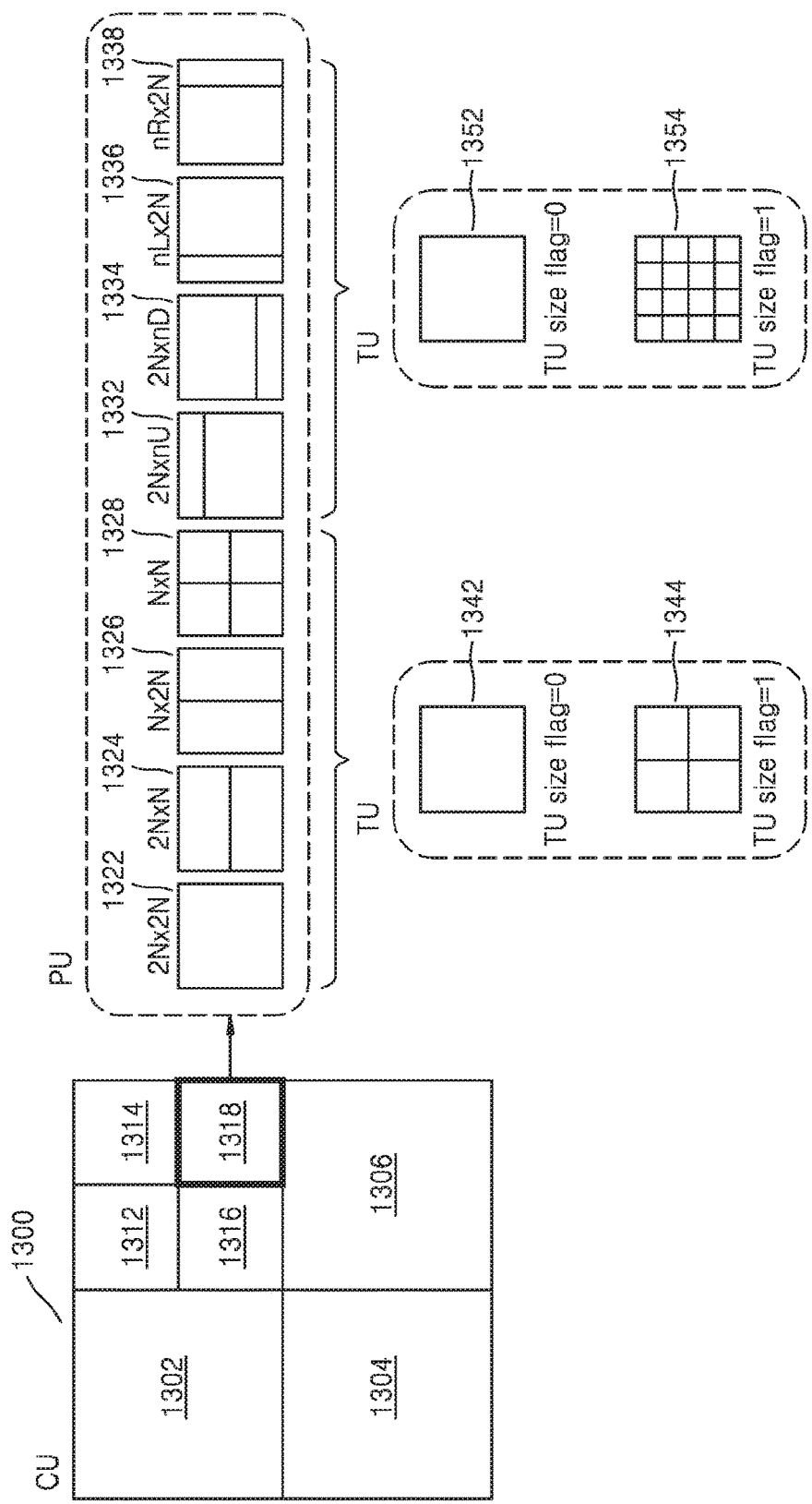
FIG. 20 is a diagram for describing a relationship between a coding unit, a prediction unit, and a transformation unit, according to encoding mode information of Table 1.

FIG. 20 is a diagram for describing a relationship between a coding unit, a prediction unit, and a transformation unit, according to encoding mode information of Table 1.

A LCU 1300 includes coding units 1302, 1304, 1306, 1312, 1314, 1316, and 1318 of depths. Here, since the coding unit 1318 is a coding unit of a depth, splitting information may be set to 0. Information about a partition mode of the coding unit 1318 having a size of 2N×2N may be set to be one of a partition mode 1322 having a size of 2N×2N, a partition mode 1324 having a size of 2N×N, a partition mode 1326 having a size of N×2N, a partition mode 1328 having a size of N×N, a partition mode 1332 having a size of 2N×nU, a partition mode 1334 having a size of 2N×nD, a partition mode 1336 having a size of nL×2N, and a partition mode 1338 having a size of nR×2N.

Splitting information (TU size flag) of a transformation unit is a type of a transformation index. The size of the transformation unit corresponding to the transformation index may be changed according to a prediction unit type or partition mode of the coding unit.

For example, when the partition mode is set to be symmetrical, i.e. the partition mode 1322, 1324, 1326, or 1328, a transformation unit 1342 having a size of 2N×2N is set if a TU size flag of a transformation unit is 0, and a transformation unit 1344 having a size of N×N is set if a TU size flag is 1.

When the partition mode is set to be asymmetrical, i.e., the partition mode 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 19, the TU size flag is a flag having a value or 0 or 1, but the TU size flag is not limited to 1 bit, and a transformation unit may be hierarchically split having a tree structure while the TU size flag increases from 0. Splitting information (TU size flag) of a transformation unit may be an example of a transformation index.

In this case, the size of a transformation unit that has been actually used may be expressed by using a TU size flag of a transformation unit, according to one or more embodiments, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

CurrMinTuSize=max(MinTransformSize,RootTuSize/(2^MaxTransformSizeIndex))     (1)

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to one or more embodiments, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

RootTuSize=min(MaxTransformSize,PUSize)     (2)

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

RootTuSize=min(MaxTransformSize,PartitionSize)     (3)

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the embodiments are not limited thereto.

According to the video encoding method based on coding units having a tree structure as described with reference to FIGS. 8 through 20, image data of the space domain is encoded for each coding unit of a tree structure. According to the video decoding method based on coding units having a tree structure, decoding is performed for each LCU to reconstruct image data of the space domain. Thus, a picture and a video that is a picture sequence may be reconstructed. The reconstructed video may be reproduced by a reproducing apparatus, stored in a storage medium, or transmitted through a network.

The embodiments may be written as computer programs and may be implemented in general-use digital computers that execute the programs using a computer-readable recording medium. Examples of the computer-readable recording medium include magnetic storage media (e.g., ROM, floppy discs, hard discs, etc.) and optical recording media (e.g., CD-ROMs, or DVDs).

For convenience of description, the video encoding method and/or the video encoding method described above will be referred to as a 'video encoding method according to the various embodiments.' In addition, the video decoding method and/or the video decoding method described above, will be referred to as a 'video decoding method according to the various embodiments.'

A video encoding apparatus including the video encoding apparatus 10, the video encoding apparatus 100, or the image encoder 400, which is described above, will be referred to as a 'video encoding apparatus according to the various embodiments'. In addition, a video decoding apparatus including the video decoding apparatus 20, the video decoding apparatus 200, or the image decoder 500, which is described above, will be referred to as a 'video decoding apparatus according to the various embodiments.'

A computer-readable recording medium storing a program, e.g., a disc 26000, according to various embodiments will now be described in detail.

FIG. 2821 is a diagram of a physical structure of the disc 26000 in which a program is stored, according to one or more embodiments. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 29.

Figure 22:
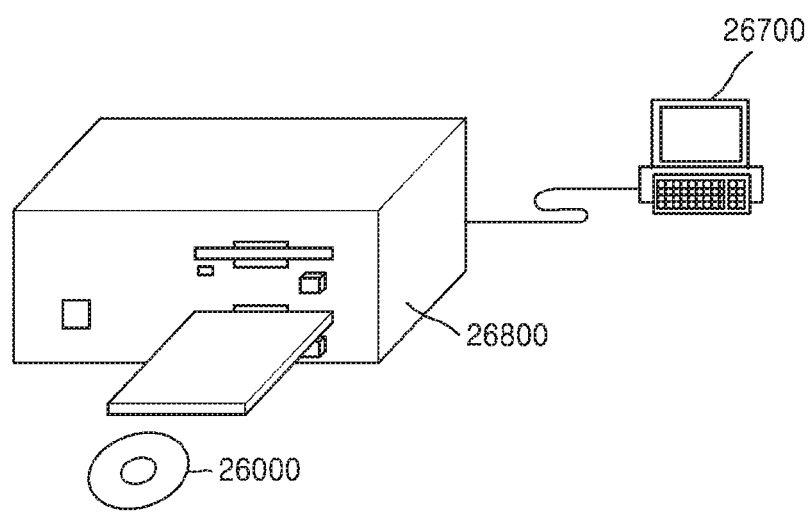
FIG. 22 is a diagram of a disc drive for recording and reading a program by using a disc.

FIG. 22 is a diagram of a disc drive 26800 for recording and reading a program by using the disc 26000. A computer system 26700 may store a program that executes at least one selected from a video encoding method and a video decoding method according to one or more embodiments, in the disc 26000 via the disc drive 26800. To run the program stored in the disc 26000 in the computer system 26700, the program may be read from the disc 26000 and be transmitted to the computer system 26700 by using the disc drive 26700.

Figure 21:
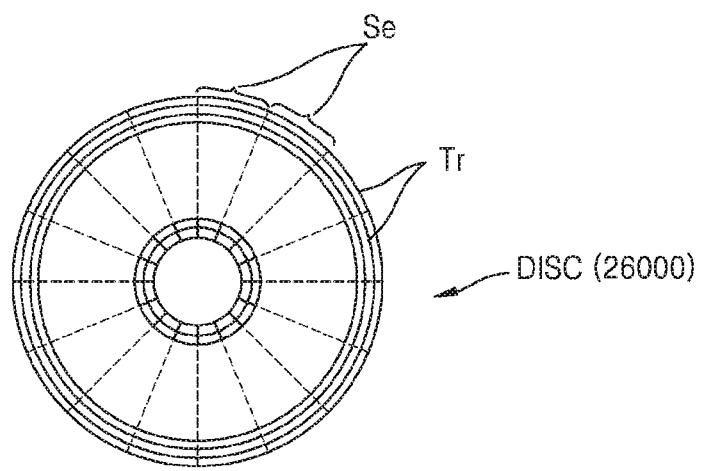
FIG. 21 is a diagram of a physical structure of a disc in which a program is stored, according to an embodiment.

The program that executes at least one selected from a video encoding method and a video decoding method according to one or more embodiments may be stored not only in the disc 26000 illustrated in FIG. 21 or 22 but also in a memory card, a ROM cassette, or a solid state drive (SSD).

A system to which the video encoding method and a video decoding method described above are applied will be described below.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to one or more embodiments.

The mobile phone 12500 included in the content supply system 11000 according to one or more embodiments will now be described in greater detail with referring to FIGS. 24 and 25.

Figure 24:
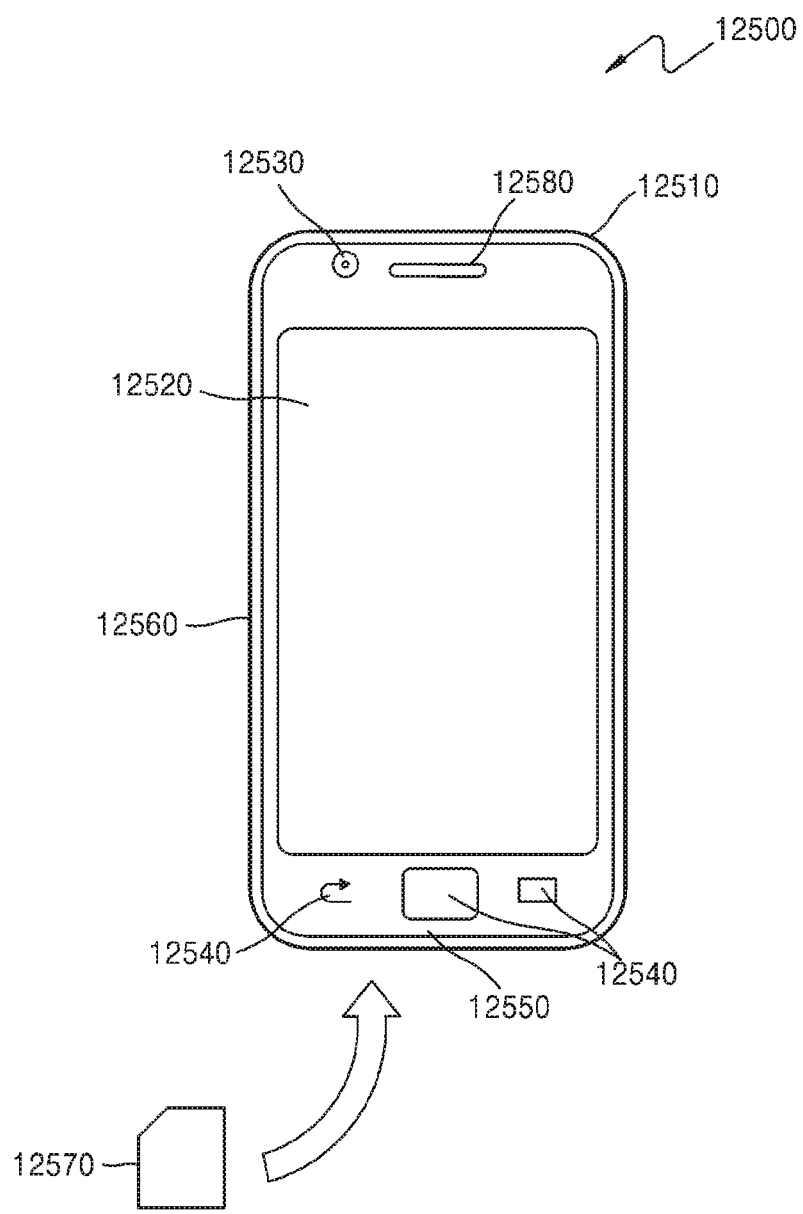
FIGS. 24 and 25 are diagrams respectively of an external structure and an internal structure of a mobile phone to which a video encoding method and a video decoding method are applied, according to an embodiment.

FIG. 24 illustrates an external structure of the mobile phone 12500 to which a video encoding method and a video decoding method are applied, according to one or more embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of sound outputter, and a microphone 12550 for inputting voice and sound or another type sound inputter. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
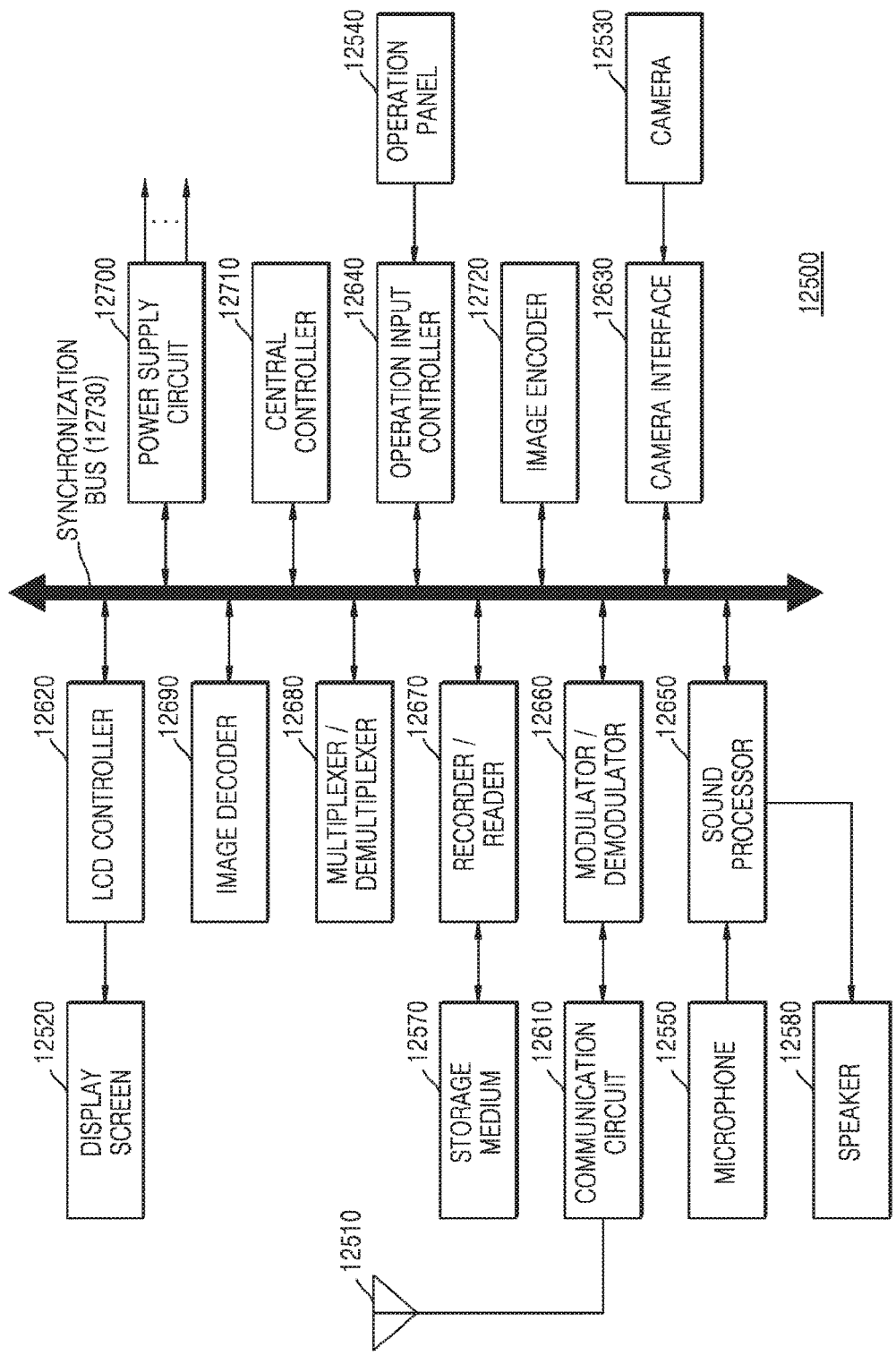

FIG. 25 illustrates an internal structure of the mobile phone 12500, according to one or more embodiments. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12710, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding method according to the one or more embodiments. The image encoder 12720 may transform the image data received from the camera 12530 into compressed and encoded image data based on the above-described video encoding method according to the one or more embodiments, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoder 12690 may correspond to that of the above-described video decoding method according to the one or more embodiments. The image decoder 12690 may decode the encoded video data to obtain reconstructed video data and provide the reconstructed video data to the display screen 12520 via the LCD controller 12620, by using the above-described video decoding method according to the one or more embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to one or more embodiments, may be a transceiving terminal including only the video encoding apparatus, or may be a transceiving terminal including only the video decoding apparatus.

Figure 26:
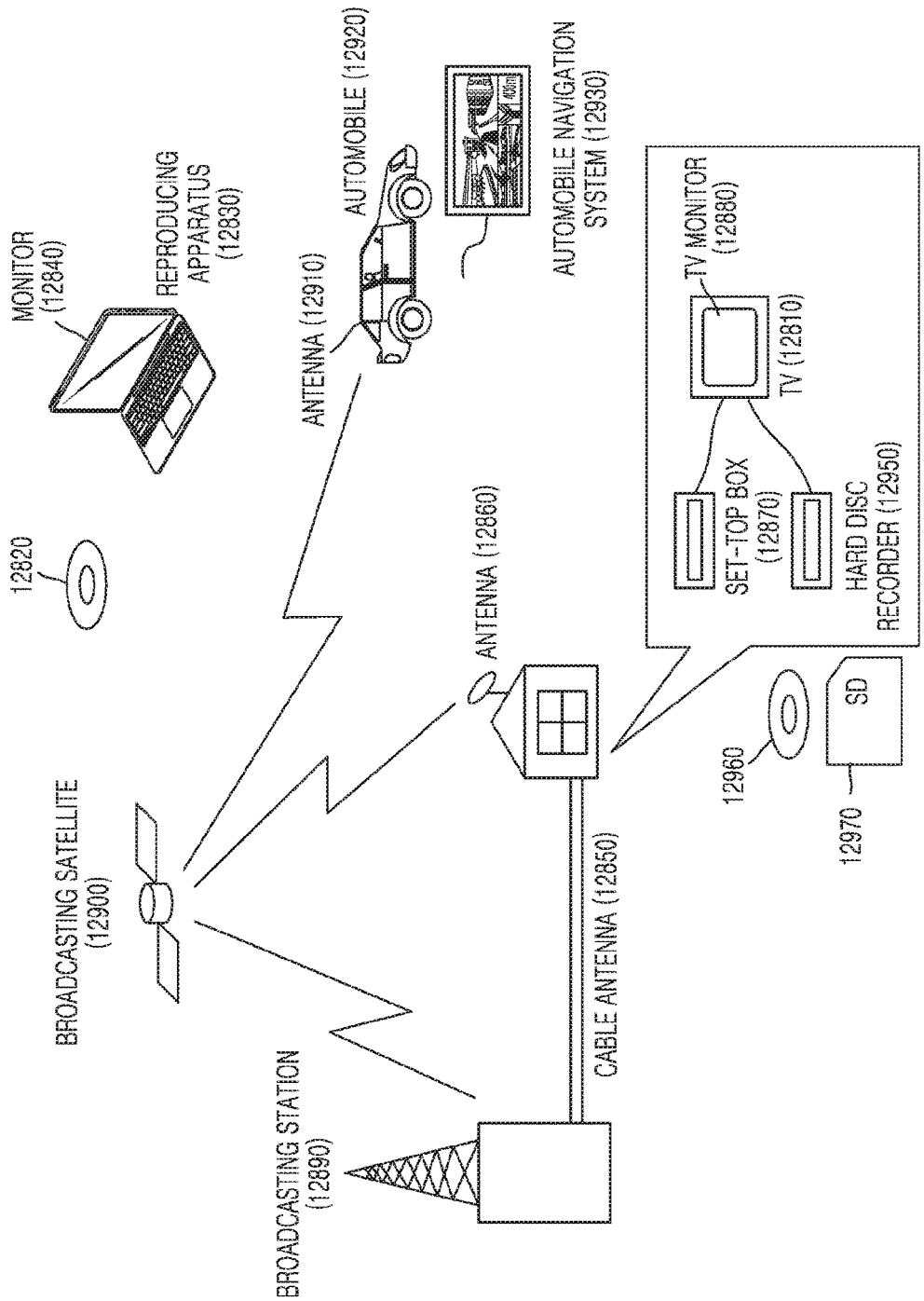
FIG. 26 is a diagram of a digital broadcast system to which a communication system is applied, according to an embodiment.

A communication system according to the one or more embodiments is not limited to the communication system described above with reference to FIG. 24. For example, FIG. 26 illustrates a digital broadcasting system employing a communication system, according to one or more embodiments. The digital broadcasting system of FIG. 26 may receive a digital broadcast transmitted via a satellite or a terrestrial network by using a video encoding apparatus and a video decoding apparatus according to one or more embodiments.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to one or more embodiments is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to one or more embodiments may be installed. Data output from the set-top box 12870 may also be reproduced on a TV monitor 12880.

As another example, a video decoding apparatus according to one or more embodiments may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to one or more embodiments and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to one or more embodiments, a video signal recorded on the DVD disc 12960, the SD card 12970, or another storage medium may be reproduced on the TV monitor 12880.

The automobile navigation system 12930 may not include the camera 12530 of FIG. 26, and the camera interface 12630 and the image encoder 12720 of FIG. 26. For example, the computer 12100 and the TV receiver 12810 may not include the camera 12530, the camera interface 12630, and the image encoder 12720.

Figure 27:
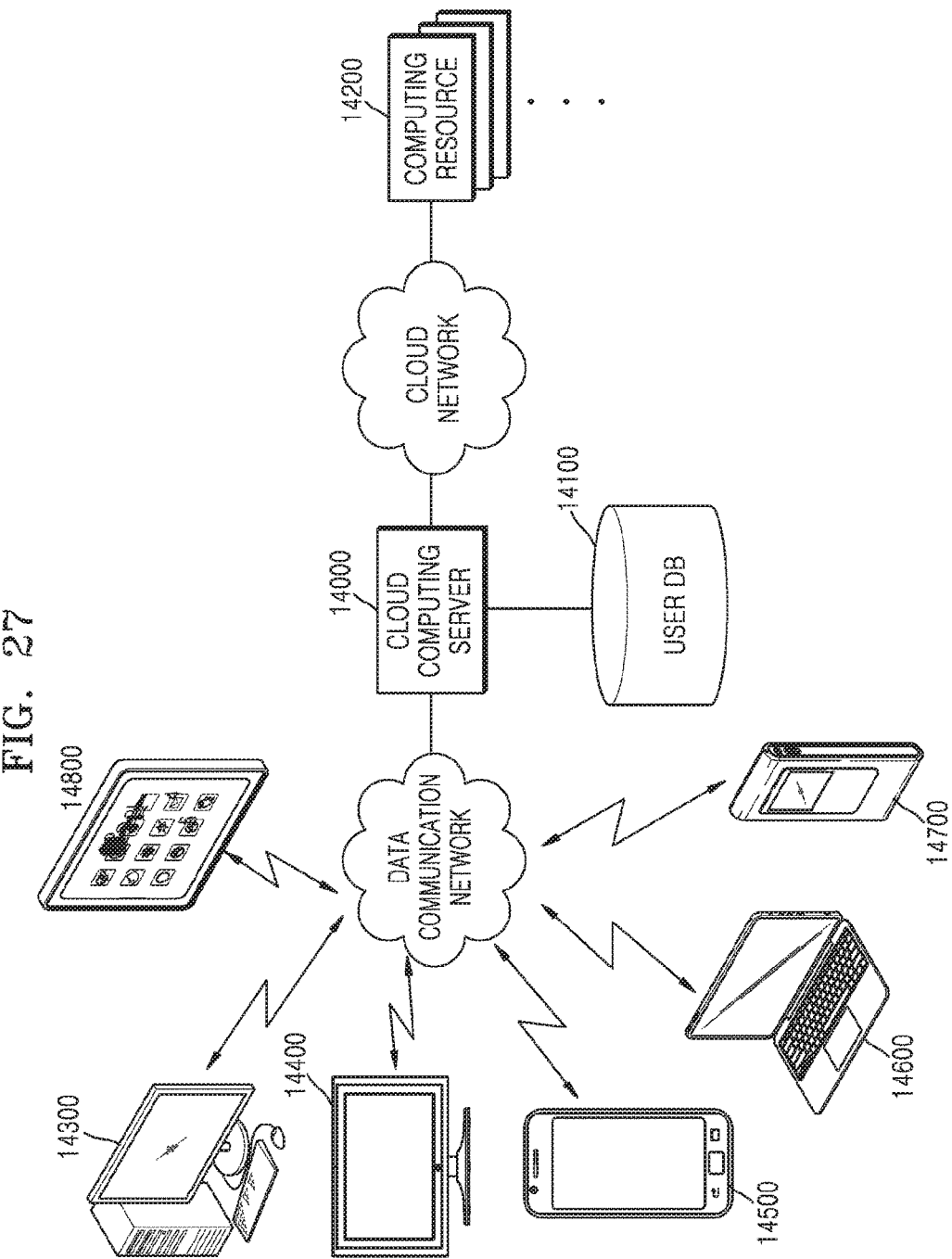
FIG. 27 is a diagram of a network structure of a cloud computing system using a video encoding apparatus and a video decoding apparatus, according to an embodiment.

FIG. 27 is a diagram illustrating a network structure of a cloud computing system using a video encoding apparatus and a video decoding apparatus, according to one or more embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the above-described video decoding apparatus. As another example, the user terminal may include the above-described video encoding apparatus. Alternatively, the user terminal may include both the above-described video decoding apparatus and the above-described video encoding apparatus.

Various applications of a video encoding method, a video decoding method, a video encoding apparatus, and a video decoding apparatus according to the one or more embodiments described above have been described above. However, methods of storing the video encoding method and the video decoding method in a storage medium or methods of implementing the video encoding apparatus and the video decoding apparatus in a device, according to various embodiments, described above are not limited to the embodiments described above.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A video decoding method comprising:
parsing, from a bitstream, information about a filter parameter set for correcting a first sample by using a second sample;
determining, from among the first sample and the second sample with different color components, at least one second sample that is used to correct a value of the first sample;
determining the filter parameter set based on the parsed information;
upsampling the at least one second sample;
filtering a value of the upsampled at least one second sample by using the determined filter parameter set; and
correcting the value of the first sample by using the filtered value of the upsampled at least one second sample,
wherein the first sample is any one of a luma sample and a chroma sample, and the second sample is any one of the luma sample and the chroma sample that is not the first sample.

2. The method of claim 1, wherein the determining of the filter parameter set comprises determining the filter parameter set based on a band including the value of the first sample, wherein the band is from among a plurality of bands determined by dividing a total range of sample values into signaled intervals or predetermined intervals.

3. The method of claim 1, wherein the determining of the at least one second sample comprises determining at least one second sample located in an area corresponding to the first sample, and
the second sample is a sample included in a base layer.

4. The method of claim 2, wherein the determining of the filter parameter set comprises:
receiving filter parameter sets that correspond to the plurality of bands; and
determining, from among the received filter parameter sets, a filter parameter set that corresponds to the band including the value of the first sample as a filter parameter set that is used to correct the value of the first sample.

5. The method of claim 4, wherein the receiving of the filter parameter sets comprises receiving the filter parameter sets via a picture parameter set (PPS).

6. The method of claim 1, wherein the determining of the filter parameter set comprises determining a filter parameter set that is used to correct the value of the first sample, from among filter parameter sets that correspond to blocks included in a current image.

7. The method of claim 1, wherein the method is performed in at least one selected from an intra prediction filter, an inter prediction filter, a post-processing filter, and an in-loop filter.

8. The method of claim 2, wherein the determining of the filter parameter set comprises determining a filter parameter set that corresponds to the band including the value of the first sample, from among filter parameter sets that respectively correspond to the plurality of bands.

9. A video encoding method comprising:
- determining, from among a first sample and a second sample with different color components, at least one second sample that is used to correct a value of the first sample;
- determining a filter parameter set for correcting the first sample by using the second sample;
- upsampling the at least one second sample;
- filtering a value of the upsampled at least one second sample by using the determined filter parameter set;
- correcting the value of the first sample by using the filtered value of the upsampled at least one second sample; and
- generating information about the filter parameter set by encoding the determined filter parameter set,
- wherein the first sample is any one of a luma sample and a chroma sample, and the second sample is any one of the luma sample and the chroma sample that is not the first sample.

10. The method of claim 9, wherein the determining of the filter parameter set comprises determining the filter parameter set based on a band including the value of the first sample, wherein the band is from among a plurality of bands determined by dividing a total range of sample values into signaled intervals or predetermined intervals.

11. The method of claim 10, further comprising transmitting filter parameter sets that correspond to the plurality of bands.

12. The method of claim 11, wherein the transmitting of the filter parameter sets comprises transmitting the filter parameter sets via a picture parameter set (PPS).

13. The method of claim 9, wherein the determining of the at least one second sample comprises determining at least one second sample located in an area corresponding to a location of the first sample, and
the second sample is a sample included in a base layer.

14. The method of claim 9, wherein the determining of the filter parameter set comprises determining the filter parameter set from among filter parameter sets that correspond to blocks included in a current image.

15. The method of claim 10, wherein the determining of the filter parameter set comprises determining a filter parameter set that corresponds to the band including the value of the first sample, from among filter parameter sets that respectively corresponding to the plurality of bands.

16. A video decoding apparatus comprising at least one processor configured to:
- parse, from a bitstream, information about a filter parameter set for correcting a first sample by using a second sample,
- determine, from among the first sample and the second sample with different color components, at least one second sample that is used to correct per QS a value of the first sample,
- determine the filter parameter set based on the parsed information,
- upsample the at least one second sample,
- filter a value of the at least one second sample by using the determined filter parameter set, and
- correct the value of the first sample by using the filtered value of the at least one second sample,
- wherein the first sample is any one of a luma sample and a chroma sample, and the second sample is any one of the luma sample and the chroma sample that is not the first sample.

17. A video encoding apparatus comprising at least one processor configured to:
- determine, from among a first sample and a second sample with different color components, at least one second sample that is used to correct a value of the first sample,
- determine a filter parameter set for correcting the first sample by using the second sample,
- upsample the at least one second sample,
- filter a value of the upsampled at least one second sample by using the determined filter parameter set,
- correct the value of the first sample by using the filtered value of the upsampled at least one second sample, and
- generate information about the filter parameter set by encoding the determined filter parameter set,
- wherein the first sample is any one of a luma sample and a chroma sample, and the second sample is any one of the luma sample and the chroma sample that is not the first sample.

* * * * *